(12) United States Patent
DeVilbiss et al.

(10) Patent No.: US 8,135,934 B2
(45) Date of Patent: Mar. 13, 2012

(54) DYNAMICALLY ALLOCATING LIMITED SYSTEM MEMORY FOR DMA AMONG MULTIPLE ADAPTERS

(75) Inventors: Colin R. DeVilbiss, Rochester, MN (US); Wayne G. Holm, Rochester, MN (US); David B. Murray, Rochester, MN (US); Kristopher C. Whitney, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 12/473,573

(22) Filed: May 28, 2009

(65) Prior Publication Data

US 2010/0306494 A1 Dec. 2, 2010

(51) Int. Cl.
*G06F 12/02* (2006.01)

(52) U.S. Cl. ................ 711/170; 711/173; 711/E12.001; 711/E12.002; 710/22

(58) Field of Classification Search .................. 711/170, 711/173, 12.001, E12.002, E12.001; 710/22
See application file for complete search history.

(56) References Cited

U.S. PATENT DOCUMENTS

| | | | |
|---|---|---|---|
| 2002/0112102 A1* | 8/2002 | Tarui et al. ...................... | 710/60 |
| 2007/0038836 A1* | 2/2007 | Hintermeister et al. ...... | 711/173 |
| 2009/0307447 A1* | 12/2009 | Jacobs et al. .................. | 711/162 |

OTHER PUBLICATIONS

Allocating System-Space Memory, Apr. 11, 2003.*

* cited by examiner

*Primary Examiner* — Hoai V Ho
(74) *Attorney, Agent, or Firm* — Joan Pennington

(57) ABSTRACT

A method, apparatus, and computer program product dynamically allocate limited system memory for direct memory access (DMA) among a plurality of input/output (I/O) adapters in a system partition. Initially a minimum entitlement of I/O entitled memory capacity is allocated to each of the respective multiple I/O adapters. The minimum entitlement enables operation of an I/O adapter driver. Additional entitlement of I/O entitled memory capacity is selectively allocated based upon I/O demands of each I/O adapter.

20 Claims, 39 Drawing Sheets

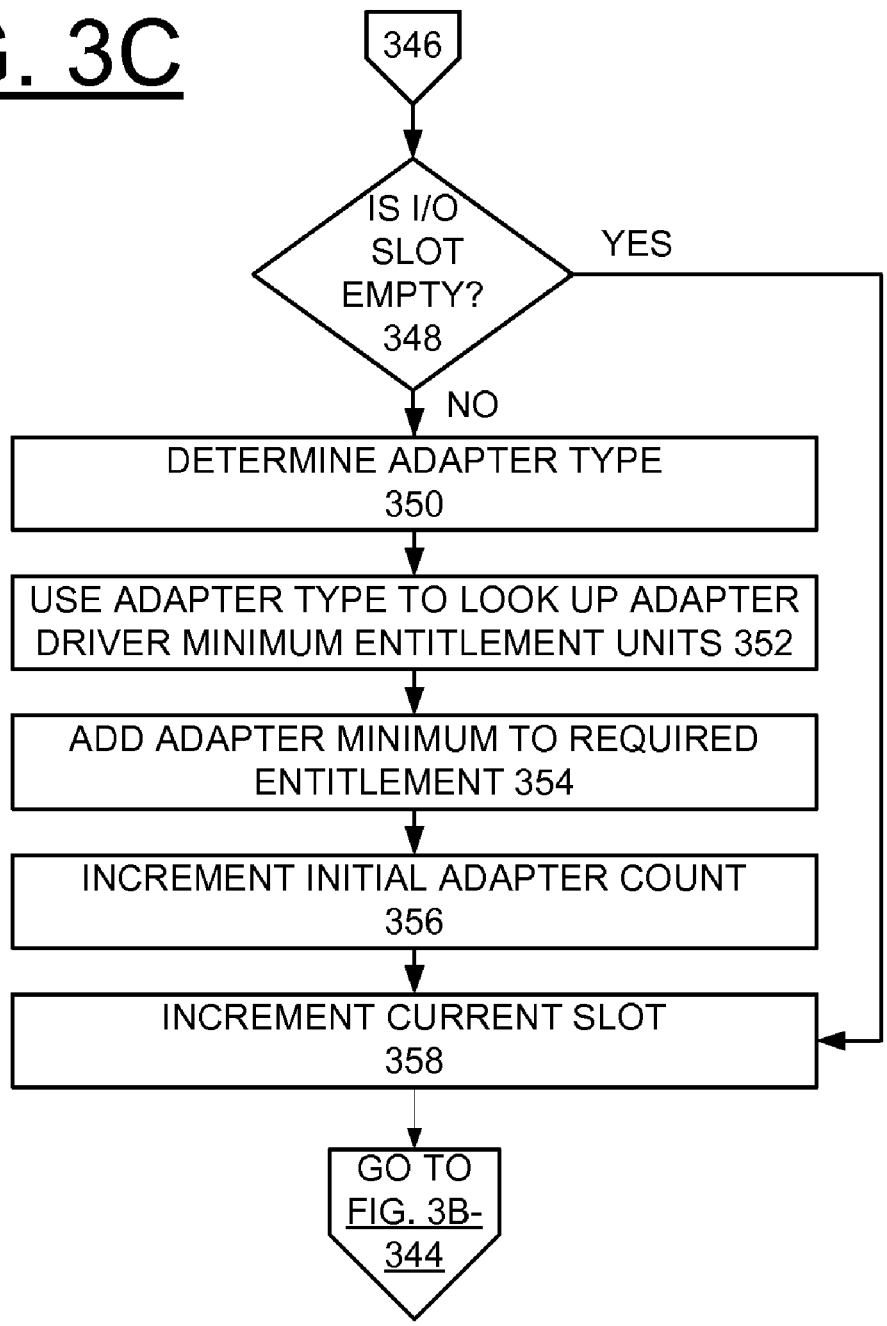

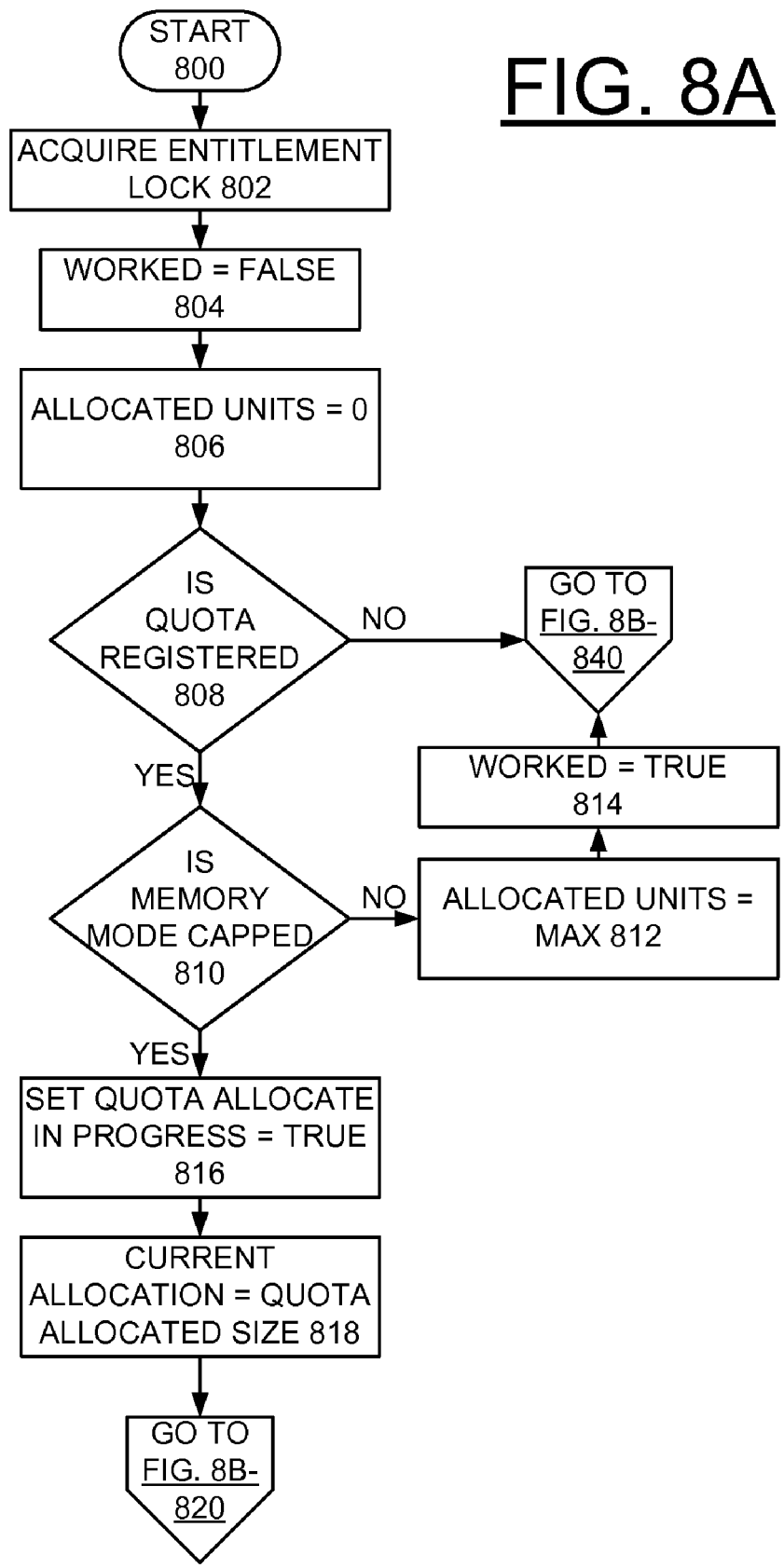

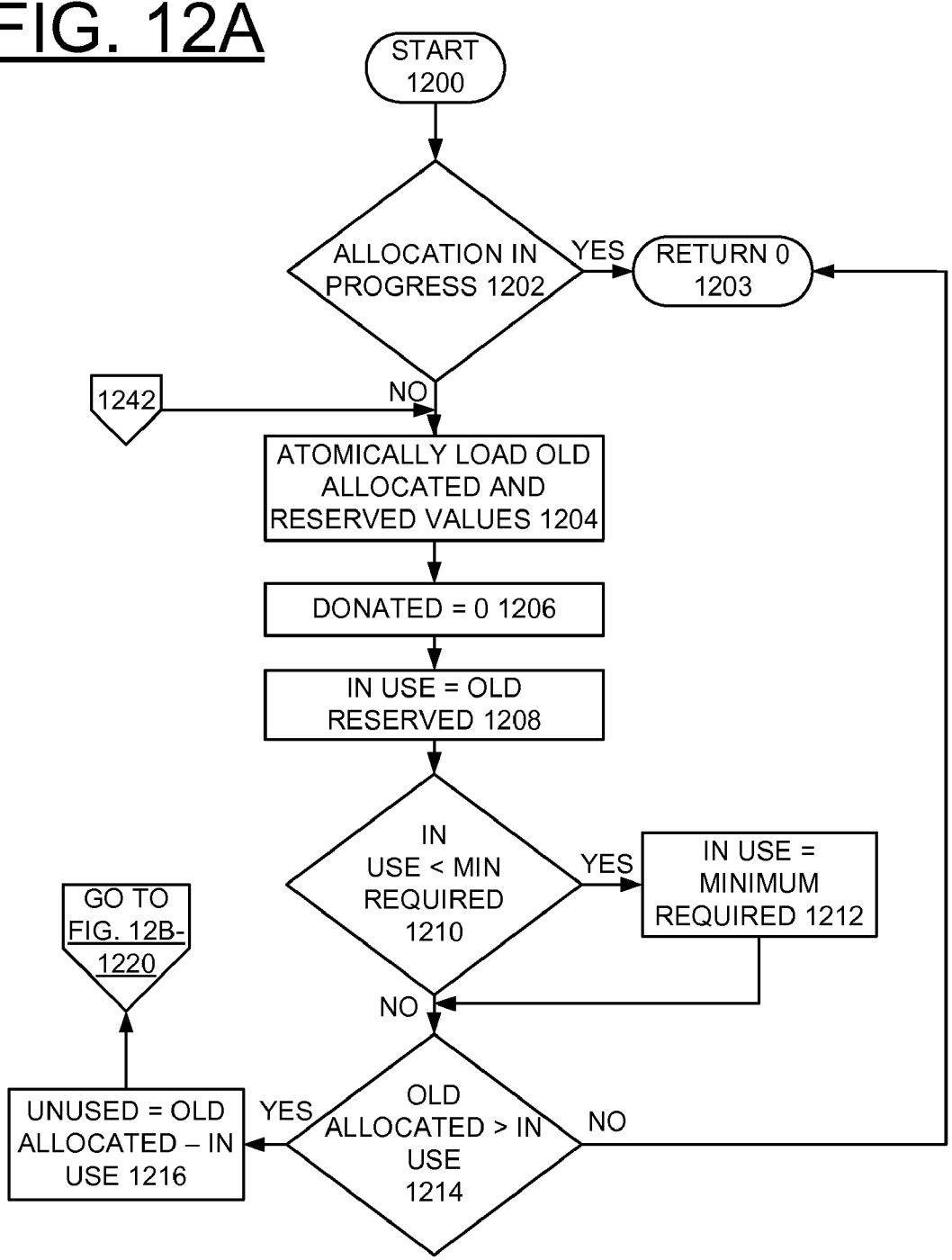

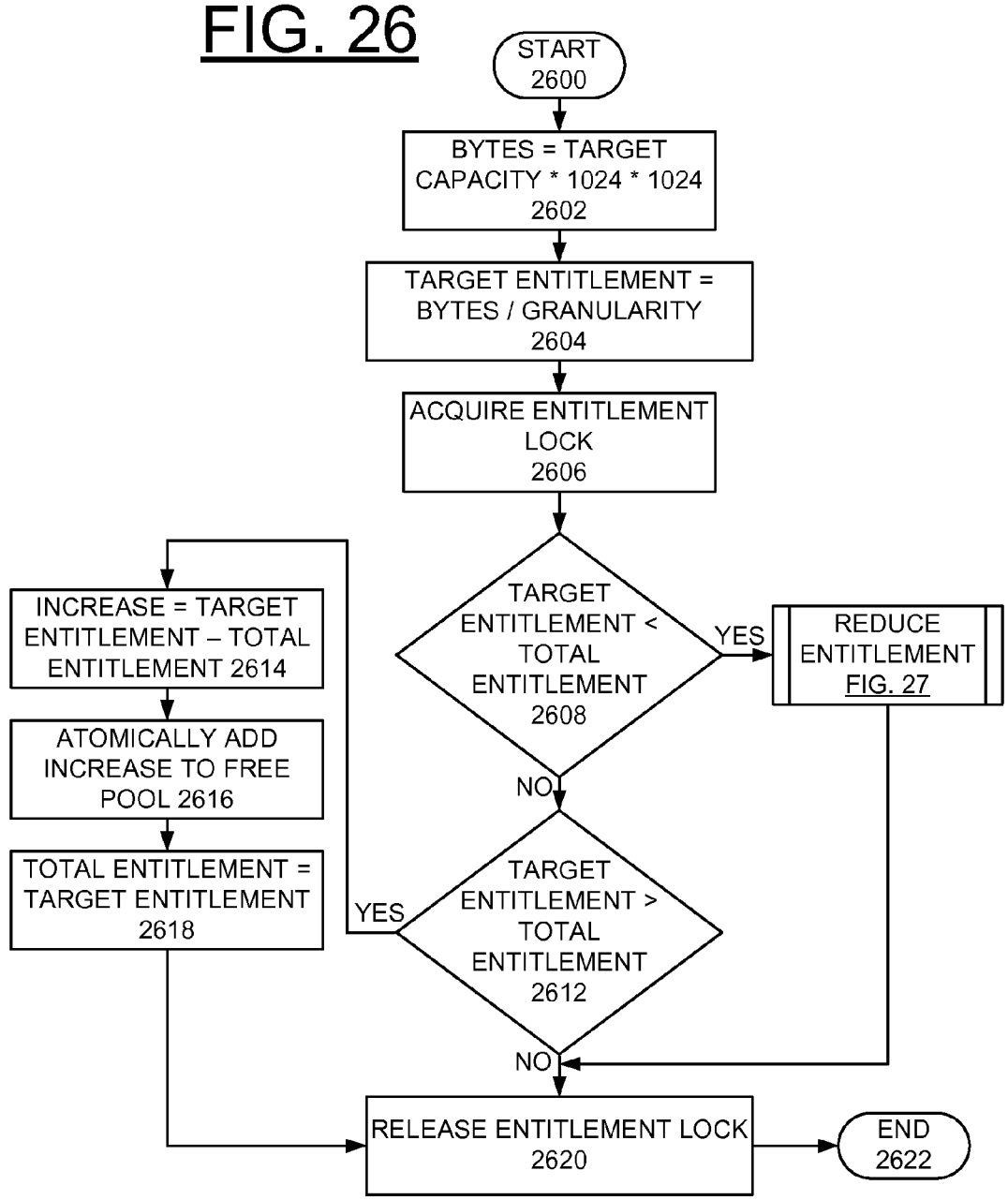

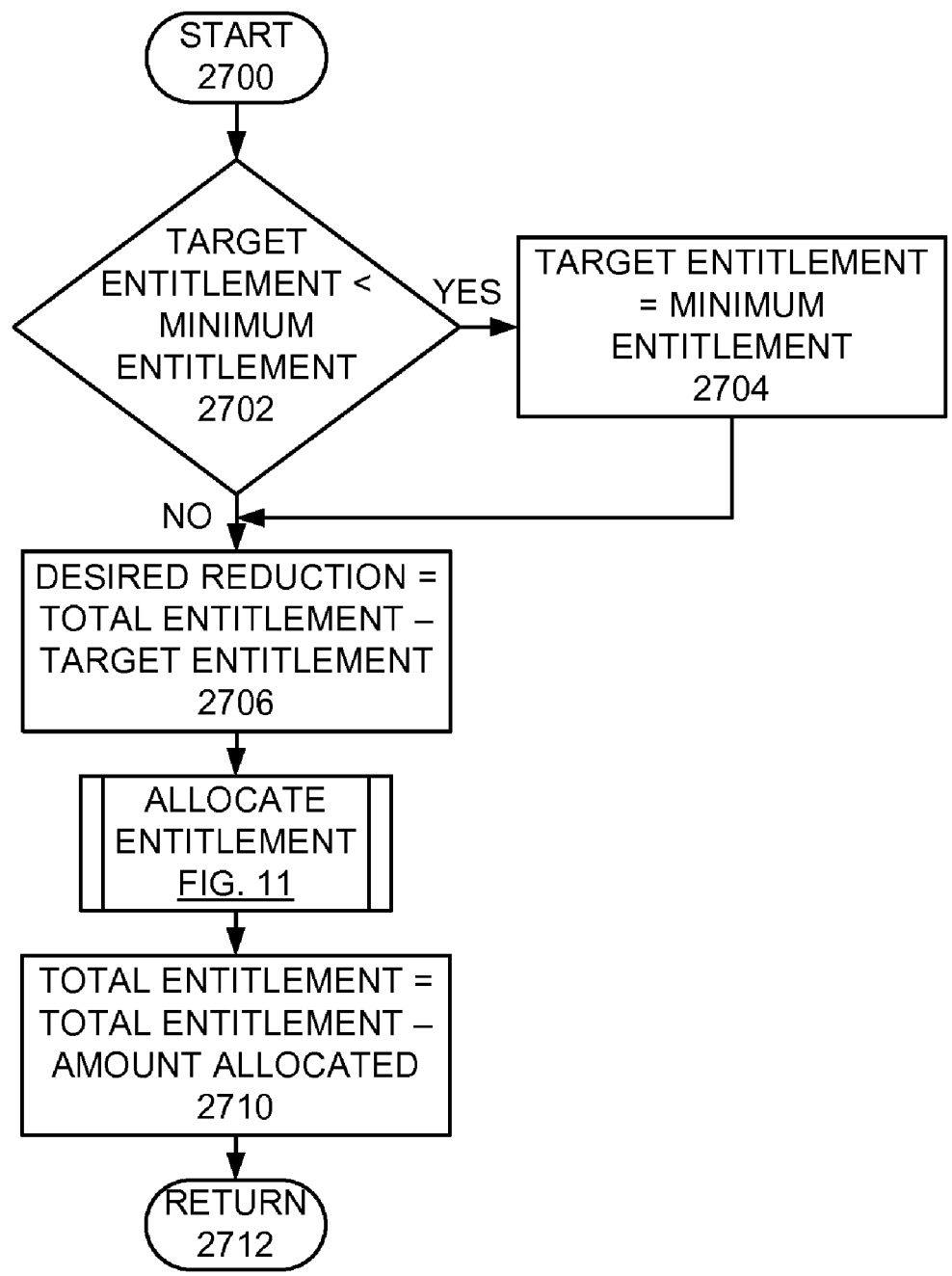

DYNAMICALLY ALLOCATING LIMITED SYSTEM MEMORY FOR DMA AMONG MULTIPLE ADAPTERS

FIELD OF THE INVENTION

The present invention relates generally to the data processing field, and more particularly, relates to a method, apparatus, and computer program product for dynamically allocating limited system memory for direct memory access (DMA) among multiple input/output (I/O) adapters.

DESCRIPTION OF THE RELATED ART

In most systems today, I/O memory is system memory used for DMA and is mapped from some partition of the system main memory. If another adapter is added, then more memory is consumed from the system main memory, but in general some system main memory should be available. Also the I/O memory is required to be non-pageable memory.

With the invention of virtual real memory, the partition's view of what the physical memory assigned may not actually be the amount of physical memory directly accessible. From the system's point of view, the sum of the physical memory of the partitions may exceed the actual amount of physical memory.

Also, there is still the requirement that the I/O memory be assigned directly to the partition. In this case, the hypervisor assigns a fixed amount of I/O memory capacity to the partition and the partition needs to operate within this boundary. If the partition does not allocate the I/O memory efficiently, there may be severe performance impacts and wasted resources.

In a traditional system, any memory page may be used for I/O memory. In general this I/O capacity is limited only by the total amount of main memory.

A need exists for an effective and efficient mechanism for dynamically allocating limited system memory for direct memory access (DMA) among multiple adapters.

SUMMARY OF THE INVENTION

Principal aspects of the present invention are to provide a method, apparatus, and computer program product for dynamically allocating limited system memory for direct memory access (DMA) among multiple I/O adapters. Other important aspects of the present invention are to provide such method, apparatus, and computer program product substantially without negative effect and that overcome many of the disadvantages of prior art arrangements.

In brief, a method, apparatus, and computer program product are provided for dynamically allocating limited system memory for direct memory access (DMA) among a plurality of input/output (I/O) adapters in a system partition. Initially a minimum entitlement of I/O entitled memory capacity is allocated to each of the respective multiple I/O adapters. The minimum entitlement enables functional operation of an I/O adapter driver. Additional entitlement of I/O entitled memory capacity is selectively allocated based upon I/O demands of each I/O adapter.

In accordance with features of the invention, a partition entitlement manager controls the I/O entitled memory capacity assigned to the system partition. The partition entitlement manager determines the amount of entitlement assigned to the partition. Initially the partition entitlement manager assigns each of the plurality of I/O adapters with a capped amount of I/O memory, allowing an I/O adapter to start up in a degraded mode with minimal memory requirements. The partition entitlement manager maintains a free pool of entitlement units available to I/O adapters. The partition entitlement manager allocates additional entitlement units based upon increased I/O demands of the I/O adapters. The partition entitlement manager allows I/O adapter drivers to register and deregister entitlement quotas. The partition entitlement manager identifies and enforces the minimum entitlement requirements of the partition.

In accordance with features of the invention, the partition entitlement manager distributes a minimum amount of entitlement to each configured I/O adapter, and distributes additional entitlement in response to increased I/O demands. The partition entitlement manager periodically determines if unused entitlement assigned to adapter drivers should be reclaimed so that it can be made available to adapter drivers that are constrained by entitlement availability. The partition entitlement manager allows the amount of entitlement assigned to the partition to change dynamically.

In accordance with features of the invention, the initial capped amount of I/O memory is a minimum amount that is required to start each respective adapter and drive each device attached to the respective adapter. The initial capped amount of I/O memory allows the I/O adapter to be functional, but does not guarantee any performance level. Each I/O adapter is adapted to function within a range of I/O memory capacities. The partition entitlement manager allocates additional I/O memory without exceeding an optimal value, which is the most the I/O adapter would ever require.

In accordance with features of the invention, a quota is used to manage the I/O entitled memory for a specific I/O adapter. The quota allocates the initial minimum amount of entitlement required by the adapter driver to function. The quota allows the minimum amount of entitlement to be modified, such as during activation following a configuration change that affects I/O memory requirements. The quota allows entitlement allocated to the I/O adapter driver to be returned to the free pool. The quota allows the amount of entitlement allocated to be increased due to I/O demand. The quota allows an amount of unused entitlement to be returned to the free pool, for example, to help satisfy the demand of other I/O adapters or in response to a request to decrease the amount of entitlement assigned to the partition.

In accordance with features of the invention, an I/O adapter driver initialization and I/O request logic include features to allocate the minimum amount of entitlement needed by the adapter driver in order to function; to reserve the necessary entitlement prior to mapping memory for DMA, and release the entitlement reserved after the I/O request completes; and to handle insufficient entitlement by deferring an I/O request until previous I/O requests have released sufficient entitlement to satisfy the pending I/O request.

BRIEF DESCRIPTION OF THE DRAWINGS

The present invention together with the above and other objects and advantages may best be understood from the following detailed description of the preferred embodiments of the invention illustrated in the drawings, wherein:

FIGS. 3A, 3B, 3C, 4, 5, 6, 7A, 7B, 8A, 8B, 9, 10, 11, 12A, 12B, 13A, 13B, 14, 15, 16, 17, 18, 19, 20, 21, 22, 23, 24, 25A, 25B, 25C, 25D, 25E, 26, 27, and 28 are flow charts illustrating exemplary steps for implementing dynamic system memory allocation in accordance with the preferred embodiment.

DETAILED DESCRIPTION OF THE PREFERRED EMBODIMENTS

Figure 1:
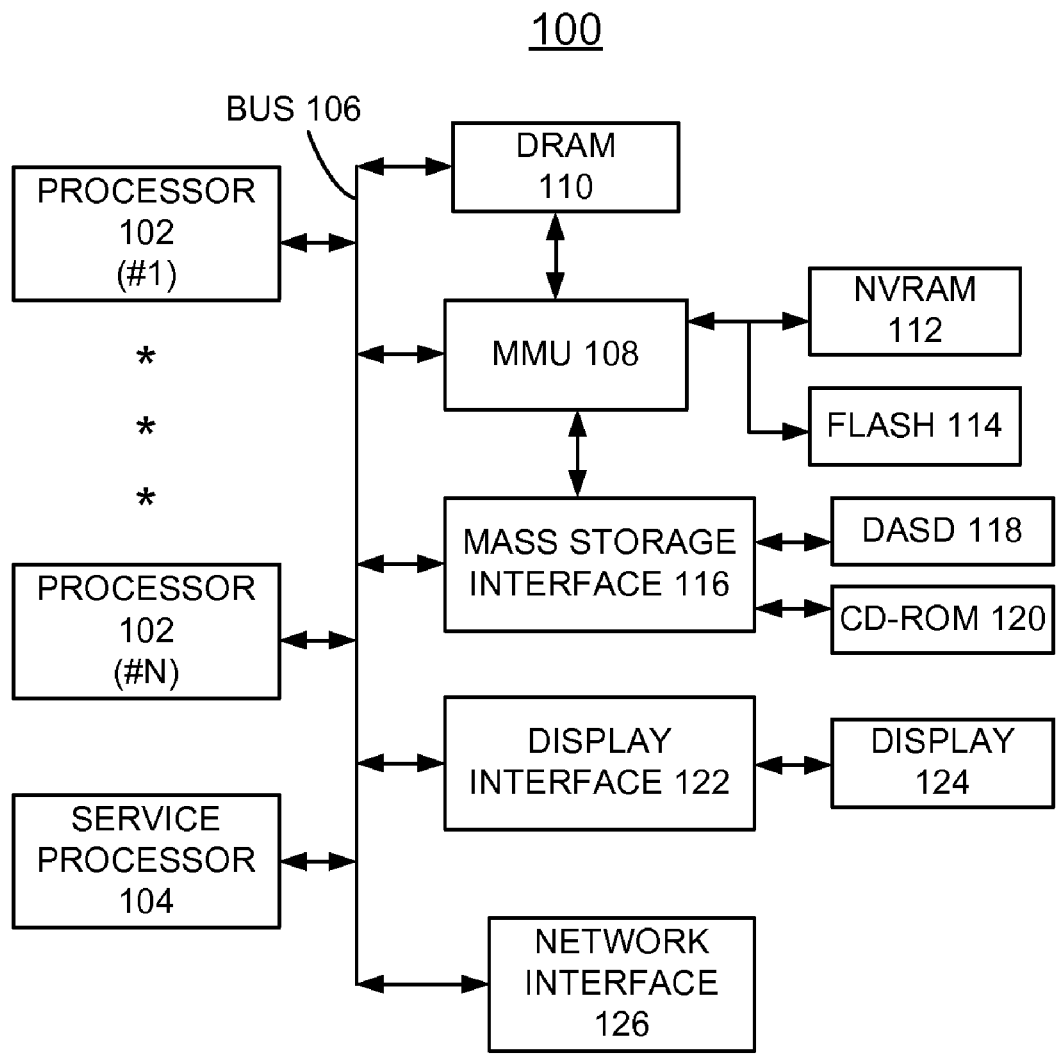
FIGS. 1, and 2 are a block diagram representations illustrating an exemplary system for dynamically allocating limited system memory for direct memory access (DMA) among multiple adapters in accordance with the preferred embodiment.

As used in the following description and claims, the following terms are generally defined as follows:

System: Computer hardware (processors, memory, and I/O devices) and the software and/or firmware instructions or code, which manage the system hardware resources, including operating system software, or perform a specific function for the system user, application and utility software.

Partition: a logical subset of a system's resources, including processors, memory, and/or I/O devices, combined with discrete operating system and application software so that a partition can independently utilize a portion of the overall system's resources. From the partition's point of view, it is a self-contained system and is not aware of other partitions or any computer resources not assigned to it. A partition may also be known as a logical partition (LPAR) or Virtual Machine. The terms "partition" and "system" are used interchangeably while the described embodiment is designed for use in a partitioned environment utilizing shared memory pools.

Hypervisor: in a logically partitioned system, the hypervisor manages the distribution of system hardware resources to one or more partitions. Some or all of the partition resources may be virtualized so that multiple partitions can share the same physical hardware resources. Examples of virtualization include shared processor pools, shared memory pools, and virtual I/O adapters.

I/O Adapter: a system resource, which provides access to one or more I/O devices. For example, a Small Computer System Interface (SCSI) adapter provides access to SCSI devices such as disk units, tape devices, CD/DVD devices, media changers, and the like. A partition I/O adapter may be a physical hardware device or a virtual device, which accesses hardware resources via another partition, called a virtual I/O server.

I/O Adapter Driver: the code and data used by the system to perform I/O operations to a specific I/O adapter and its devices. The driver data includes metadata used to manage the adapter hardware, such as state information, device lists, I/O queues, and the like, as well as individual device I/O requests.

Adapter Driver Activation: the process whereby the driver for a specific I/O adapter becomes operational. Activation may occur automatically when the adapter is discovered by the system, or may involve some type of manual or programmatic configuration action after system initialization/boot/IPL is complete.

DMA (Direct Memory Access): A feature whereby an I/O device has direct read and/or write access to a specified portion or portions of system memory.

Memory Page: a predefined unit of system memory. To map memory for DMA to/from an I/O device, every memory page that contains data to be transferred must be mapped, while the I/O device may transfer only a portion of a given page during the DMA operation. On some known systems the page size is 4K bytes.

I/O Memory: one or more pages that are accessible for DMA while an I/O device processes an I/O request. Each I/O memory page is required to remain at a fixed physical memory address for the entire duration of device I/O request processing.

DMA Mapping: an implementation-specific process whereby system software makes memory pages accessible for DMA by an I/O device.

I/O Entitled Memory Capacity: a software enforced limit to the amount of partition memory that may be mapped for DMA at any single point in time. Commonly referred to as entitlement.

Entitlement Granularity: the amount of entitlement in bytes that is consumed when a page is mapped for DMA. The granularity is an integer multiple of the DMA page size, and is most efficient when the granularity is exactly equal to the page size.

Entitlement Units: a unit of measurement corresponding to the amount of memory equal to the entitlement granularity. For example, if the entitlement granularity is 4K one unit of entitlement would represent 4K. This invention uses entitlement units to manage entitlement so that it can support variability in the entitlement granularity with minimal code impacts.

Partition Entitlement Manager: a set of software instructions and data used to manage the entitled memory capacity assigned to the partition.

Allocated Entitlement: entitlement units that are assigned to I/O adapter drivers. Each driver is allocated a portion of the total entitlement for its exclusive use.

Reserved Entitlement: entitlement units representing the number of pages mapped for DMA at a single point in time.

Free Memory Pool: entitlement units that have not been allocated to any adapter driver. Units in the free memory pool are available for allocation by any adapter. This invention uses a first-come, first-serve algorithm to service requests for additional entitlement and a mechanism whereby adapter drivers may voluntarily return ("donate") allocated entitlement back to the free memory pool when requested by the entitlement manager.

Minimum entitlement: For a specific I/O adapter driver, the minimum amount of entitlement units required by that adapter driver to operate. The entitlement allocated by an operational adapter driver may be greater than but never less than its minimum.

Maximum entitlement: For a specific I/O adapter driver, the maximum amount of entitlement it estimates that it could consume. It is expected that the entitlement allocated by the adapter driver will never exceed this value but this is not enforced.

Quota: a set of software instructions and data used to manage the entitlement used by an individual I/O adapter. Data contained within a quota includes the minimum entitlement, the maximum entitlement, the allocated entitlement, and the reserved entitlement for its corresponding adapter.

I/O Request: a set of software instructions and data used to perform an individual I/O operation to an I/O device. Besides the memory actually transferred between the system and the I/O device, the I/O request structure includes metadata used by system software to manage the I/O request.

Atomic updates: In a system utilizing more than one processor, a mechanism by which multiple processors can update a single memory location "simultaneously" without loss of information. This invention is designed for use in a multi-processor environment and so assumes that facilities for atomic memory updates are available. On POWER systems, atomic updates are performed using load and reserve instructions and store conditional instructions.

Atomic compare and store: a form of atomic update that conditionally stores a value to memory if and only if the current memory value is unchanged from a previously loaded value and a different processor has not initiated a simultaneous store to the same memory location, which is also known as a compare and swap operation. The compare and swap is used in several places to update one or more fields contained in a contiguous section of storage that is small enough to be modified by a single atomic store.

Lock: A construct, which serializes software access to a particular set of data, that is typically not in a contiguous section of memory and/or cannot be updated by a single atomic store. If a lock is not immediately available, the software must wait through some mechanism until the lock holder completes its updates and releases the lock.

Shared Lock: A form of lock that allows data protected by the lock to be accessed from multiple processors simultaneously. Shared locks are normally only used to provide read-only access to the data, read/write access typically requires exclusive locks. Shared locks commonly have exclusive modes, whereby a request to lock shared will wait if the lock is held exclusive and a request to lock exclusive will wait if the lock is held either shared or exclusive.

In accordance with features of the invention, a method provides effective, and efficient dynamic allocation of limited system memory for direct memory access (DMA) among multiple adapters. The method of the present invention enables distribution of partition I/O memory capacity based upon need of all I/O adapters.

Having reference now to the drawings, in FIG. 1, there is shown an example system generally designated by the reference character 100 for dynamically allocating limited system memory for direct memory access (DMA) among multiple adapters in accordance with the preferred embodiment.

Computer system 100 includes a plurality of processors 102, #1-N or central processor units (CPUs) 102, #1-N and a service processor 104 coupled by a system bus 106 to a memory management unit (MMU) 108 and system memory including a dynamic random access memory (DRAM) 110, a nonvolatile random access memory (NVRAM) 112, and a flash memory 114. The system bus 106 may be private or public, and it should be understood that the present invention is not limited to a particular bus topology used. A mass storage interface 116 coupled to the system bus 106 and MMU 108 connects a direct access storage device (DASD) 118 and a CD-ROM drive 120 to the main processor 102. Computer system 100 includes a display interface 122 connected to a display 124, and a network interface 126 coupled to the system bus 106.

Computer system 100 is shown in simplified form sufficient for understanding the present invention. The illustrated computer system 100 is not intended to imply architectural or functional limitations. The present invention can be used with various hardware implementations and systems and various other internal hardware devices.

Figure 2:
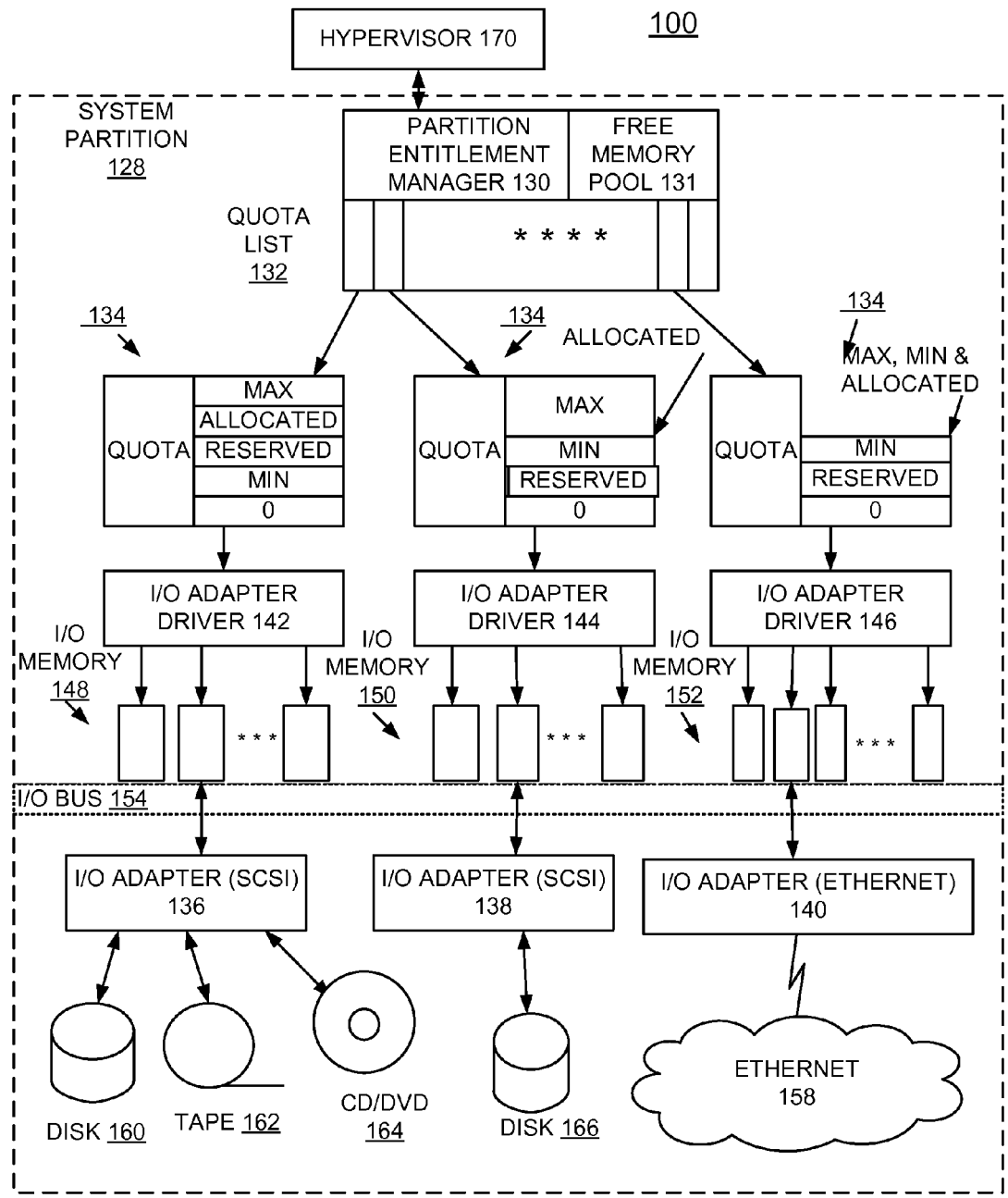

As shown in FIG. 2, computer system 100 includes a system partition 128 of the preferred embodiment. System partition 128 includes a partition entitlement manager 130 of the preferred embodiment used with a free memory pool 131. The partition entitlement manager 130 manages or controls the I/O entitled memory capacity assigned to the partition.

System partition 128 includes a quota list 132 for a plurality of quota generally designated by reference character 134, each quota 134 used to manage the entitlement used by an associated individual I/O adapter 136, 138, 140. Data contained within a quota 134 includes the minimum entitlement (MIN), the maximum entitlement (MAX), the allocated entitlement (ALLOCATED), and the reserved entitlement (RESERVED) for its corresponding I/O adapter 136, 138, 140. System partition 128 includes a respective I/O adapter driver 142, 144, 146 used with I/O memory 148, 150, and 152. The respective I/O adapter drivers 142, 144, 146 perform I/O operations for the respective I/O adapters 136, 138, 140. System partition 128 includes an I/O bus 154 coupled between the I/O memory 148, 150, and 152 and the I/O adapters 136, 138, 140. As shown, I/O adapter 140 is an Ethernet adapter coupled to Ethernet 158. As shown, the I/O adapters 136 and 138 are Small Computer System Interface (SCSI) adapters respectively providing access to SCSI devices including a disk unit 160, a tape device 162, a CD/DVD device 164, and a disk unit 166. A hypervisor 170 manages the distribution of system hardware resources to system partition 128. The I/O bus 154 may include portions of the hypervisor 170, or other software if the I/O adapters assigned to the system partition 128 are virtual adapters.

In accordance with features of the invention, the partition entitlement manager 130 provides mechanisms to determine the I/O memory mode of the partition, capped or uncapped; determine the amount of entitlement assigned to the partition; maintain a free memory pool of entitlement available to I/O adapters; allow I/O adapter drivers to register and deregister entitlement quotas; identify and enforce the minimum entitlement requirements of the partition; distribute a minimum amount of entitlement to each configured I/O adapter, and distribute additional entitlement in response to increased I/O demands; periodically determine if unused entitlement assigned to adapter drivers should be reclaimed so that it can be made available to adapter drivers that are constrained by entitlement availability; and allow the amount of entitlement assigned to the partition to change dynamically.

In accordance with features of the invention, the quota 134 is used to manage the I/O entitled memory for a specific I/O adapter 136, 138, 140. The quota 134 provides mechanisms to allocate the initial minimum amount of entitlement required by the associated adapter driver to function; allow the minimum amount of entitlement to be modified, such as during activation following a configuration change that affects I/O memory requirements, for example, pacing counts or maximum transfer sizes; allow entitlement allocated to the I/O adapter driver to be returned to the free memory pool, such as if the adapter is removed from the partition configuration; allow the amount of entitlement allocated to be increased due to I/O demand; and allow some amount of unused entitlement to be returned to the free memory pool to help satisfy the demand of other I/O adapters or in response to a request to decrease the amount of entitlement assigned to the partition.

In accordance with features of the invention, modifications are provided to I/O adapter driver initialization and I/O request logic that provide mechanisms to allocate the minimum amount of entitlement needed by the adapter driver in order to function; reserve the necessary entitlement prior to mapping memory for DMA, and release the entitlement reserved after the I/O request completes; and handle insufficient entitlement by deferring the I/O request until previous I/O requests have released sufficient entitlement to satisfy the pending request. FIGS. 3A, 3B, 3C, 4, 5, 6, 7A, 7B, 8A, 8B, 9, 10, 11, 12A, 12B, 13A, 13B, 14, 15, 17, 18, 19, 20, 21, 22, 23, 24, 25A, 25B, 25C, 25D, 25E, 26, 27, and 28 are flow charts illustrating exemplary steps for dynamically allocating limited system memory for direct memory access (DMA) among multiple adapters in accordance with the preferred embodiment.

Figure 3A:
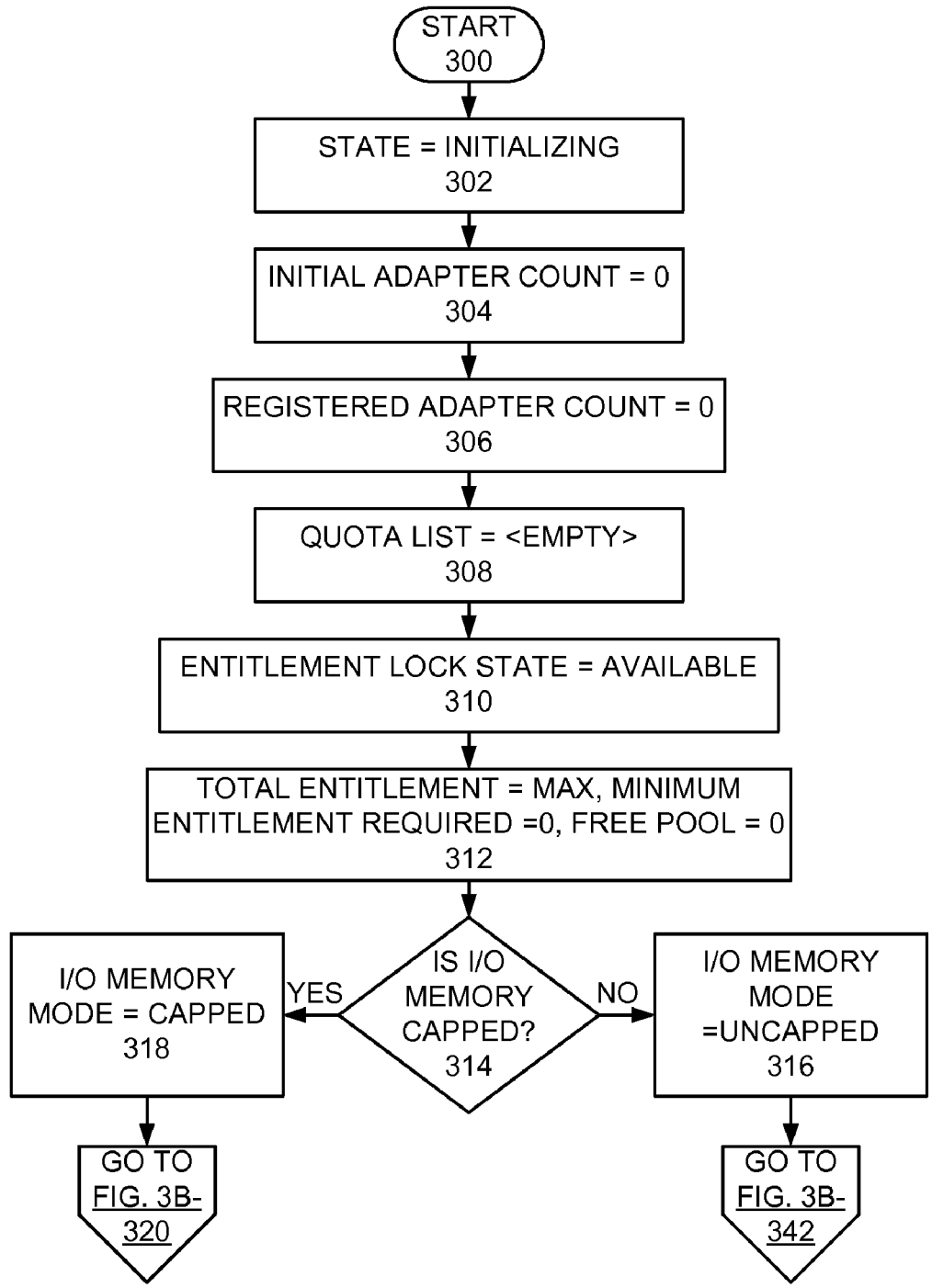
Figure 3B:
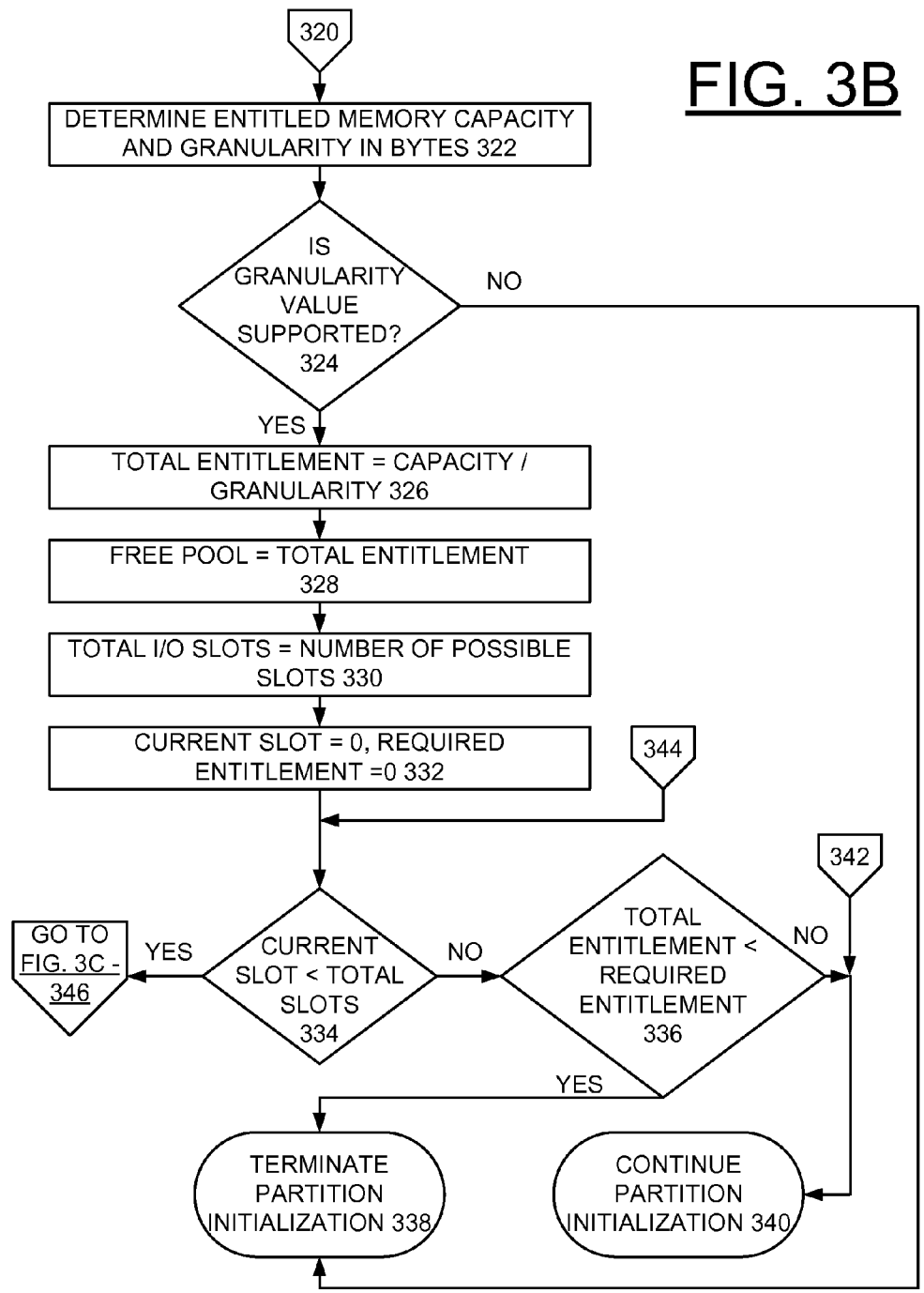

Referring now to FIGS. 3A, 3B, and 3C, there are shown exemplary steps for implementing partition entitlement manager initialization in accordance with the preferred embodiment starting at a block 300. Entitlement Manager initialization occurs during partition initialization/boot before any I/O adapter drivers are initialized.

Entitlement Manager data members are set to their initial values including the manager state set to Initializing as indicated at a block 302, the initial number of I/O adapters discovered set to (0) as indicated at a block 304, the registered adapter count set to (0) as indicated at a block 306, the registered quota list set to ({empty}) as indicated at a block 308, the entitlement lock state set to available as indicated at a block 310, and the total amount of entitlement available to the partition and the free pool size set to (0), as indicated at a block 312. For example, the maximum supported value where all entitlement data members are 4 bytes so the initialization value is 0xFFFFFFFF.

As indicated at a decision block 314, the Entitlement Manager determines if the amount of I/O memory is a capped value, in a preferred embodiment by querying the hypervisor for shared memory mode. If not Entitlement Manager initialization is complete with the I/O memory mode set to uncapped as indicated at a block 316 and the remainder of partition initialization going to FIG. 3B, at entry point 342. If I/O memory is capped as indicated at a block 318, then the operations go to FIG. 3B, at entry point 320.

Referring to FIG. 3B, the Entitlement Manager retrieves the I/O entitled memory capacity and granularity values, in a preferred embodiment by querying the hypervisor, and converts the capacity to entitlement units as indicated at a block 322. If the granularity value is supported as determined at a decision block 324, then the Entitlement Manager stores this value into the total amount of entitlement available as indicated at a block 326 as well as the Free Pool variables as indicated at a block 328. The Entitlement Manager then finds the occupied I/O slots on the system as indicated at a block 330, for example, in a preferred embodiment by querying the hypervisor for the virtual slot configuration.

The Entitlement Manager then for each occupied slot as indicated at a decision block 334 determines the type of I/O adapter, and uses this type to determine the minimum amount of entitlement required by the driver for that adapter. When current slot is less than total slot, then the operations go to FIG. 3C, at entry point 346. The minimum amount of entitlement needed during partition initialization is calculated as the summation of the adapter driver minimum for each adapter discovered. If the total amount of entitlement available to the partition is less than the minimum required as indicated at a decision block 336, the Entitlement Manager terminates partition initialization with an error code as indicated at a block 338. Otherwise, the Entitlement Manager stores the number of adapters discovered into the initial adapter count and allows partition initialization to continue as indicated at a block 340.

Referring to FIG. 3C, as indicated at a decision block 348 the Entitlement Manager determines if the I/O slot is empty. If the I/O slot is not empty, then the adapter type is determined as indicated at a block 350. Then the adapter type is used to look up adapter driver minimum entitlement units as indicated at a block 352. The value of the adapter driver minimum entitlement units is added to the required entitlement as indicated at a block 354, and the initial adapter count is incremented as indicated at a block 356. Then and when the I/O slot is empty, the current slot is incremented as indicated at a block 358. Then the operations return to FIG. 3B, following entry point 344 at decision block 334 checking the current slot.

Figure 4:
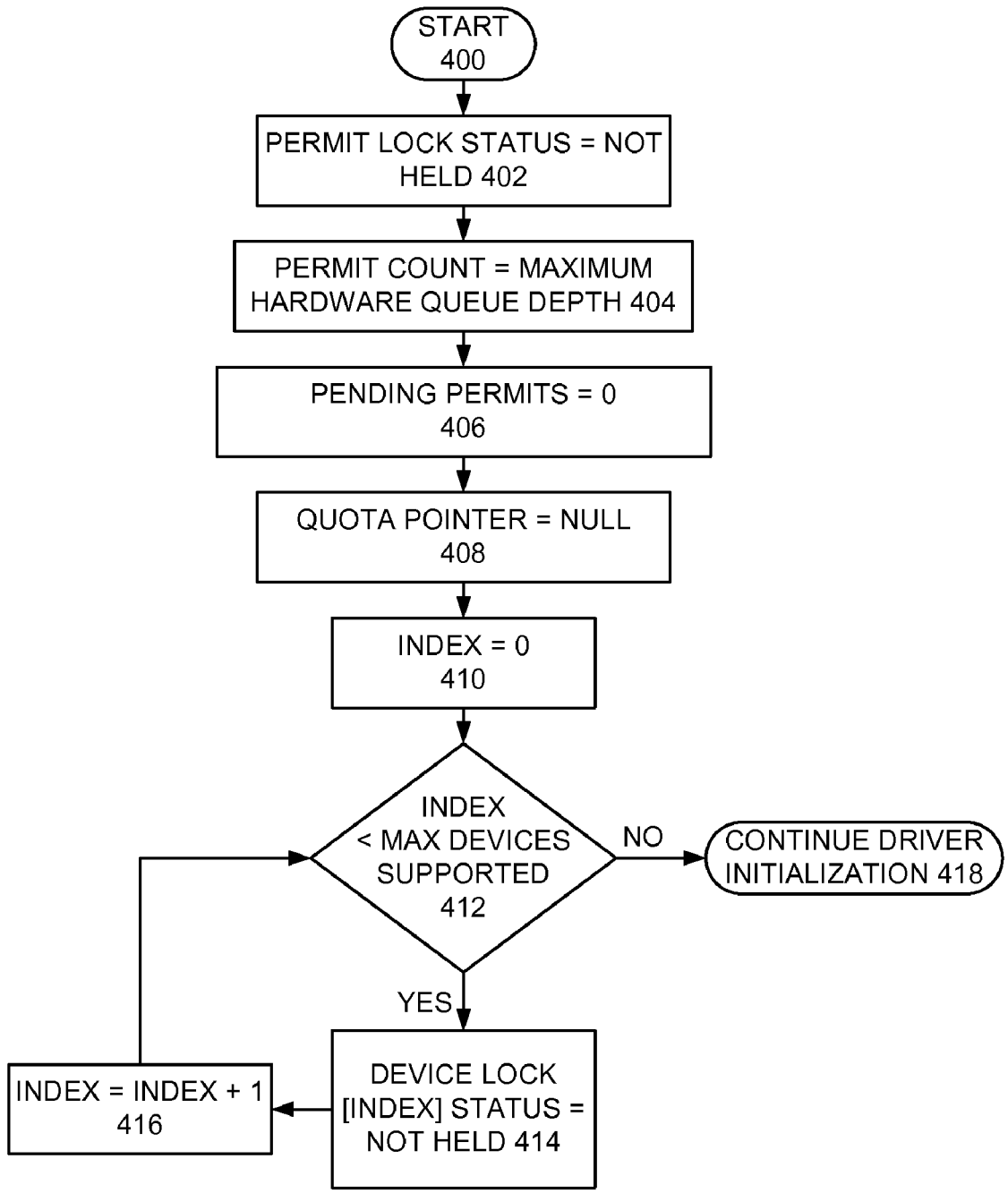

Referring now to FIG. 4, there are shown exemplary steps for implementing I/O adapter driver initialization in accordance with the preferred embodiment starting at a block 400. I/O adapter driver initialization occurs at some point after entitlement Manager initialization has completed but prior to driver activation. The permit lock status is set to not held as indicated at a block 402, the permit count is set to the maximum hardware queue depth as indicated at a block 404, the pending permits is set to (0) as indicated at a block 406, the quota pointer is set to null as indicated at a block 408, and index is set to (0) as indicated at a block 410.

As indicated at a decision block 412, the index is compared with the maximum devices supported. If the index is less than the maximum devices supported, then the device lock [index] status is set to not held as indicated at a block 414, the index value is incremented as indicated at a block 416, and then returning to decision block 412. If the index is greater than the maximum devices supported, then the operations continue with driver initialization as indicated at a block 418.

Figure 5:
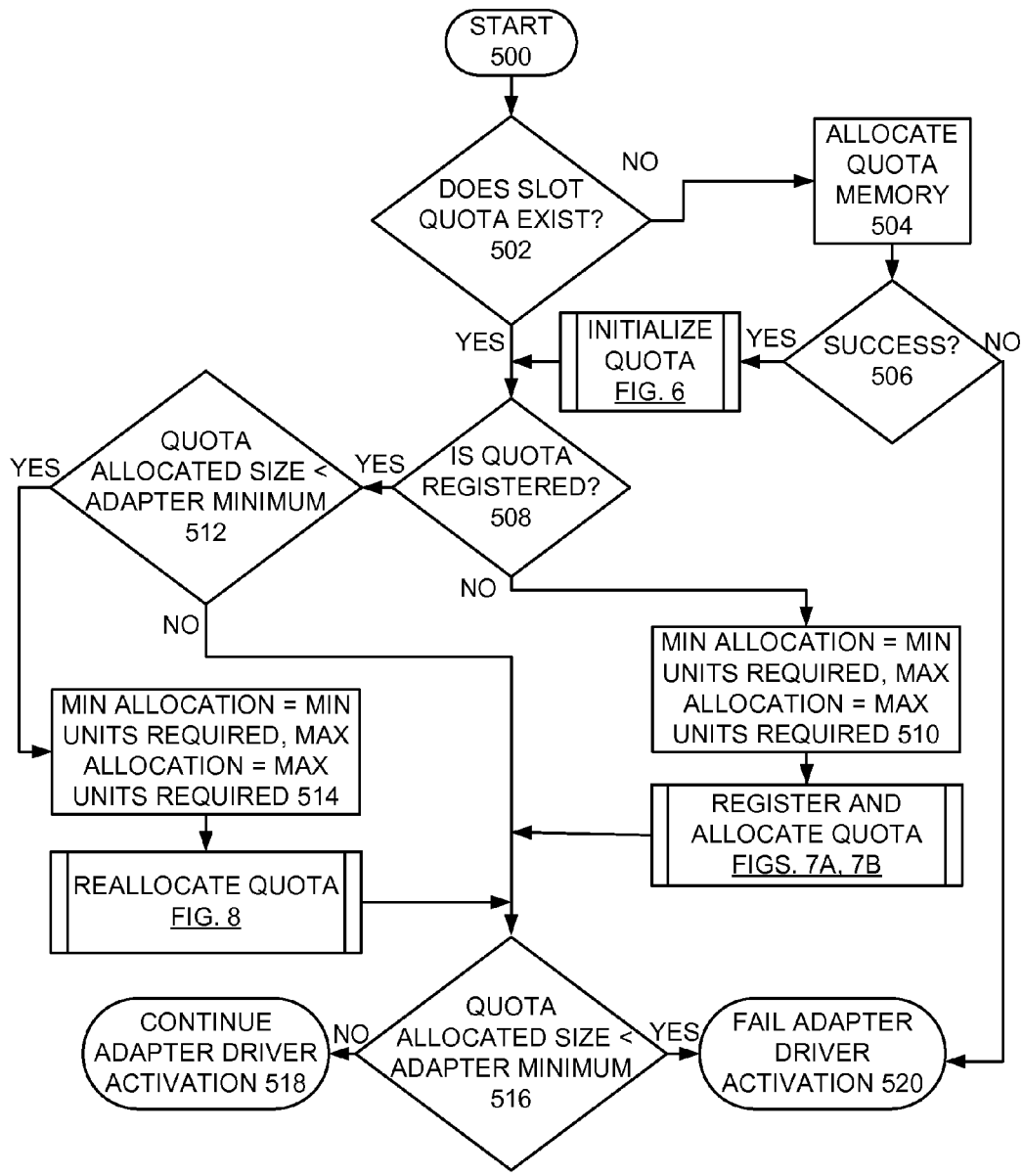
Figure 6:
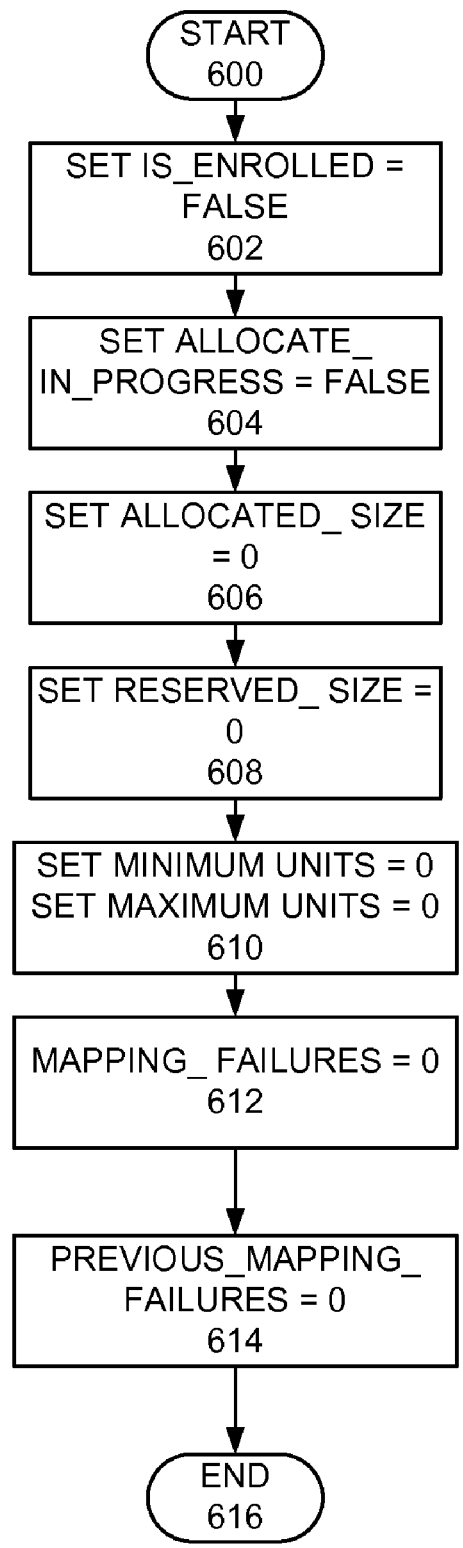
Figure 7A:
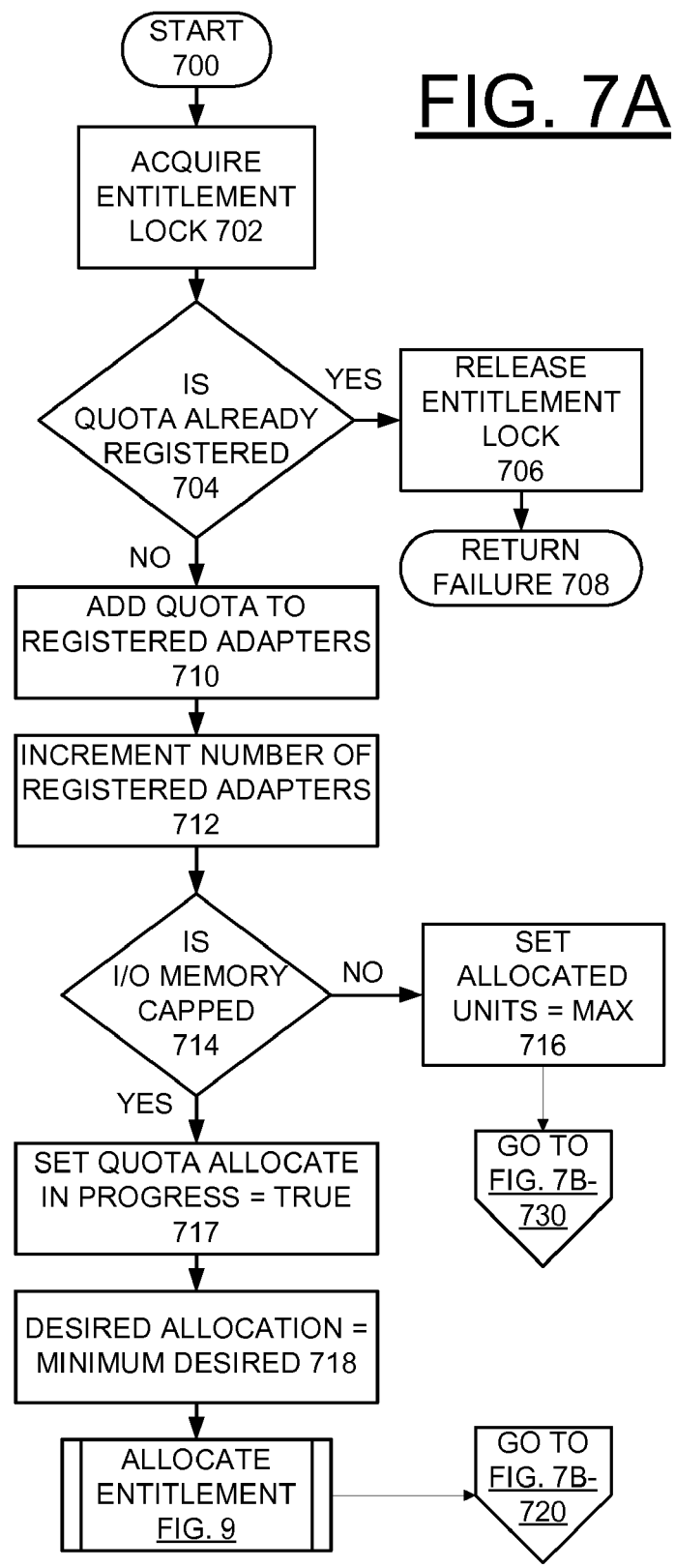
Figure 7B:
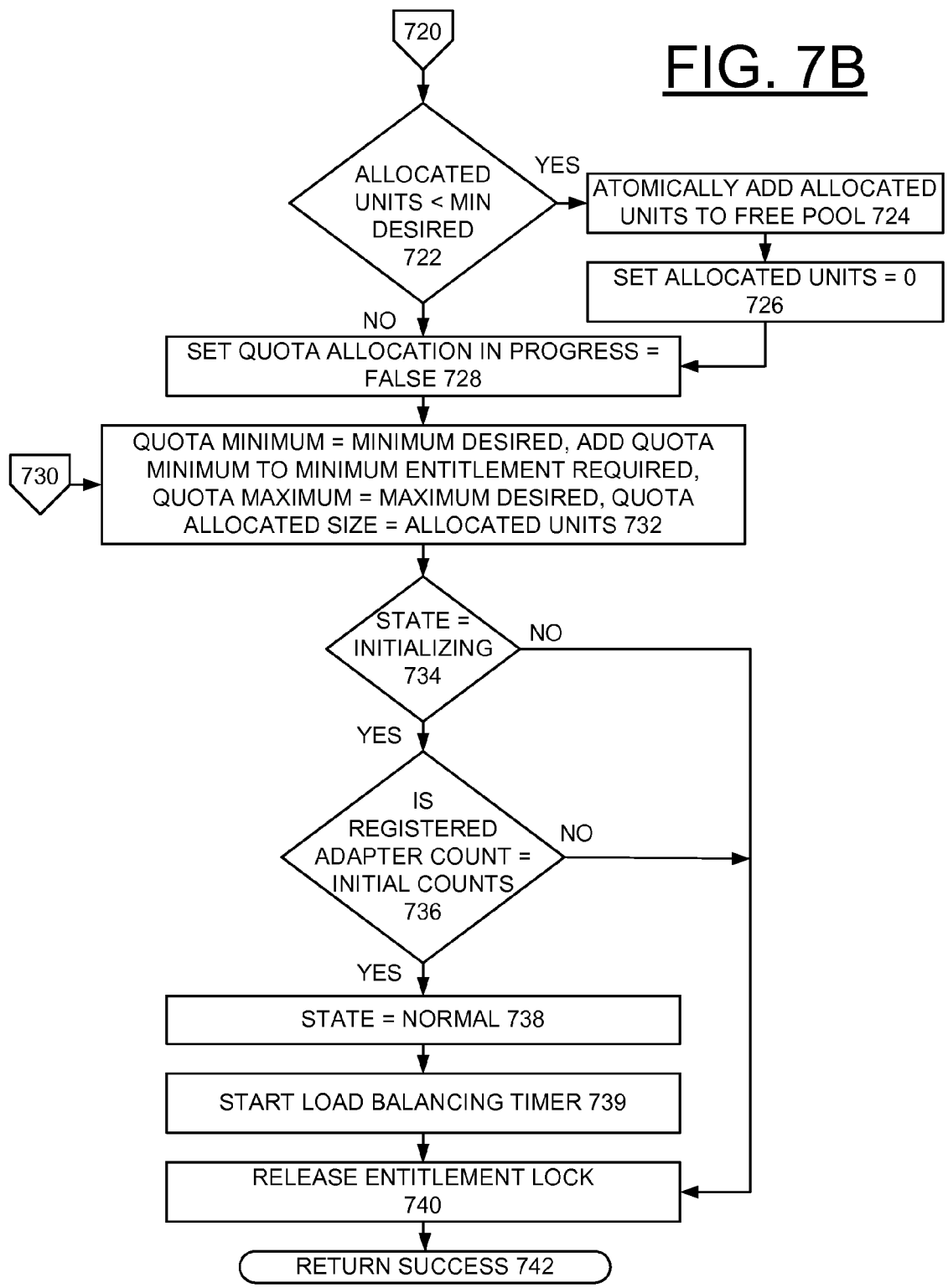

Referring now to FIG. 5, there are shown exemplary steps for implementing I/O adapter driver activation in accordance with the preferred embodiment starting at a block 500. I/O adapter driver activation supports entitlement management and exact details of how and when this logic may be used are implementation-dependent. During this portion of the activation sequence, the Adapter Driver determines if it has already created a Quota on a previous activation as indicated at a decision block 502. If not, it obtains memory for the Quota as indicated at a block 504 and as indicated at a decision block 506, and initializes it as illustrated in FIG. 6. The Adapter Driver then determines if the quota is already registered with the Entitlement Manager as indicated at a decision block 508, and if not it determines its minimum and maximum entitlement requirements as indicated at a block 510 and calls Register Quota, which is illustrated in FIGS. 7A, 7B, on the Entitlement Manager to register the quota, which also attempts to allocate the adapter minimum entitlement. Otherwise when the quota has already been registered, then the adapter driver determines if the amount of entitlement already allocated to the quota is sufficient for this activation as indicated at a decision block 512. If not, the minimum and maximum allocation units are set as indicated at a block 514, and the Adapter Driver calls Reallocate Quota as illustrated in FIG. 8 on the Entitlement Manager to try to modify the quota entitlement to the new minimum required. After calling the Entitlement Manager to obtain the entitlement needed for activation, the Adapter Driver then determines if the entitlement actually allocated to the quota is sufficient for activation as indicated at a decision block 516. If so, it continues with the activation sequence as indicated at a block 518. Otherwise the driver activation fails as indicated at a block 520.

Referring now to FIG. 6, there are shown exemplary steps for implementing quota initialization in accordance with the preferred embodiment starting at a block 600. Quota initialization occurs as new quotas are created by Adapter Drivers. A number of data members are initialized with is enrolled is set to false as indicated at a block 602, allocate in progress is set to false as indicated at a block 604, set allocated size is set to (0) as indicated at a block 606, reserved size is set to (0) as indicated at a block 608, minimum units and maximum units are set to (0) as indicated at a block 610, mapping failures are size is set to (0) as indicated at a block 612, and previous mapping failures are size is set to (0) as indicated at a block 6124, with key variables being the amount of entitlement allocated to the quota, the amount of entitlement reserved (in use), and the minimum/maximum entitlement required. Then operations are completed or end as indicated at a block 614.

Figure 9:
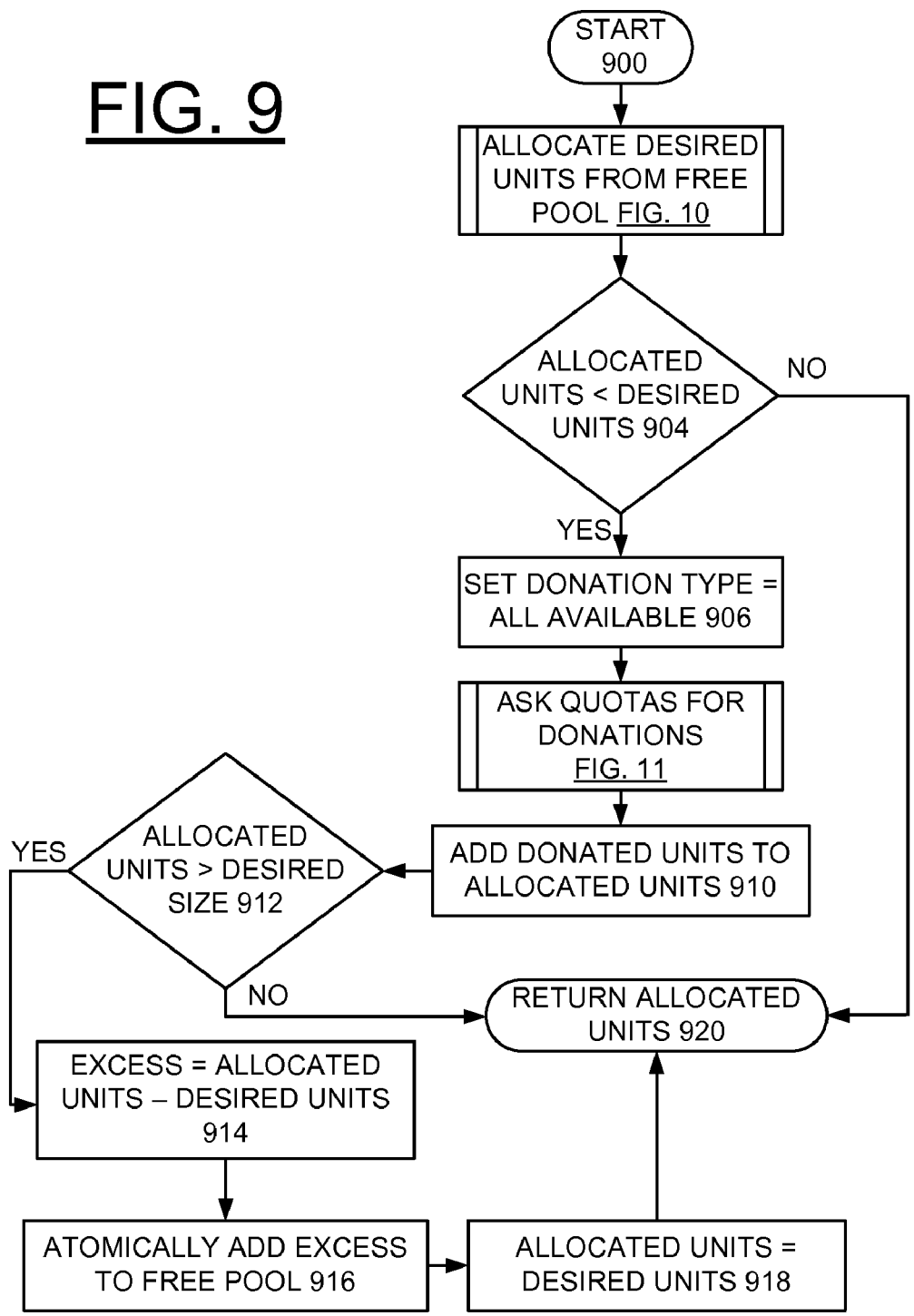

Referring now to FIGS. 7A, 7B, there are shown exemplary steps for implementing register quota in accordance with the preferred embodiment starting at a block 700. The Adapter Drivers call the illustrated Register Quota subroutine of FIGS. 7A, 7B on the Entitlement Manager during initialization/activation to notify the Entitlement Manager of a new Quota and to obtain an initial minimum quota allocation. The Entitlement Manager first obtains the entitlement lock to serialize access to its data members as indicated at a block 702, then determines if a Quota for this I/O slot has already been registered as indicated at a decision block 704. If so, the Entitlement Manager releases its lock as indicated at a block 706 and fails the registration request as indicated at a block 708. Otherwise, the Entitlement Manager adds the Quota to the registered list as indicated at a block 710 and increments the count of Quotas that have been registered as indicated at a block 712. The Entitlement Manager determines if I/O memory is capped as indicated at a decision block 714, and if not it sets the amount of entitlement allocated equal to the maximum value (0xFFFFFFFF) as indicated at a block 716 and branches to logic point in FIG. 7B, following entry point 730. If I/O memory is capped, it sets a flag in the Quota to indicate that entitlement allocation for this quota is in progress as indicated at a block 717 and calls Allocate Entitlement as illustrated in FIG. 9 to try to obtain the minimum amount of entitlement desired by the Adapter Driver and then goes to in FIG. 7B, following entry point 720.

Referring now to FIG. 7B following entry point 720, the Entitlement Manager then determines if the entitlement allocated was sufficient to satisfy the Adapter Driver minimum as indicated at a decision block 722, and if not it atomically adds the entitlement allocated back to the Free Pool as indicated at a block 724 and sets the Quota allocation to 0 as indicated at a block 726. The Quota allocate in progress flag is then turned off as indicated at a block 728. At logic entry point 730, the Quota minimum and maximum values are set to the desired Adapter Driver values, the Quota allocated value is set to the entitlement allocated, and the Quota minimum is added to the Entitlement Manager minimum entitlement required value as indicated at a block 732. The Entitlement Manager then determines if it is in Initializing state as indicated at a decision block 734 and the number of Quotas registered is now equal to the number of I/O adapters discovered during Entitlement Manager initialization as indicated at a decision block 736. If so, it changes state to Normal as indicated at a block 738, which allows Quotas to allocate entitlement beyond their minimum allocation; this is prevented in Initializing state so a single Adapter Driver could not consume all the partition entitlement before other Adapter Drivers had a chance to obtain their minimum allocation, and starts a timer to drive entitlement redistribution or load balancing logic as indicated at a block 739. Finally, the Entitlement Driver releases its entitlement lock as indicated at a block 740 and returns as indicated at a block 742.

Figure 8B:
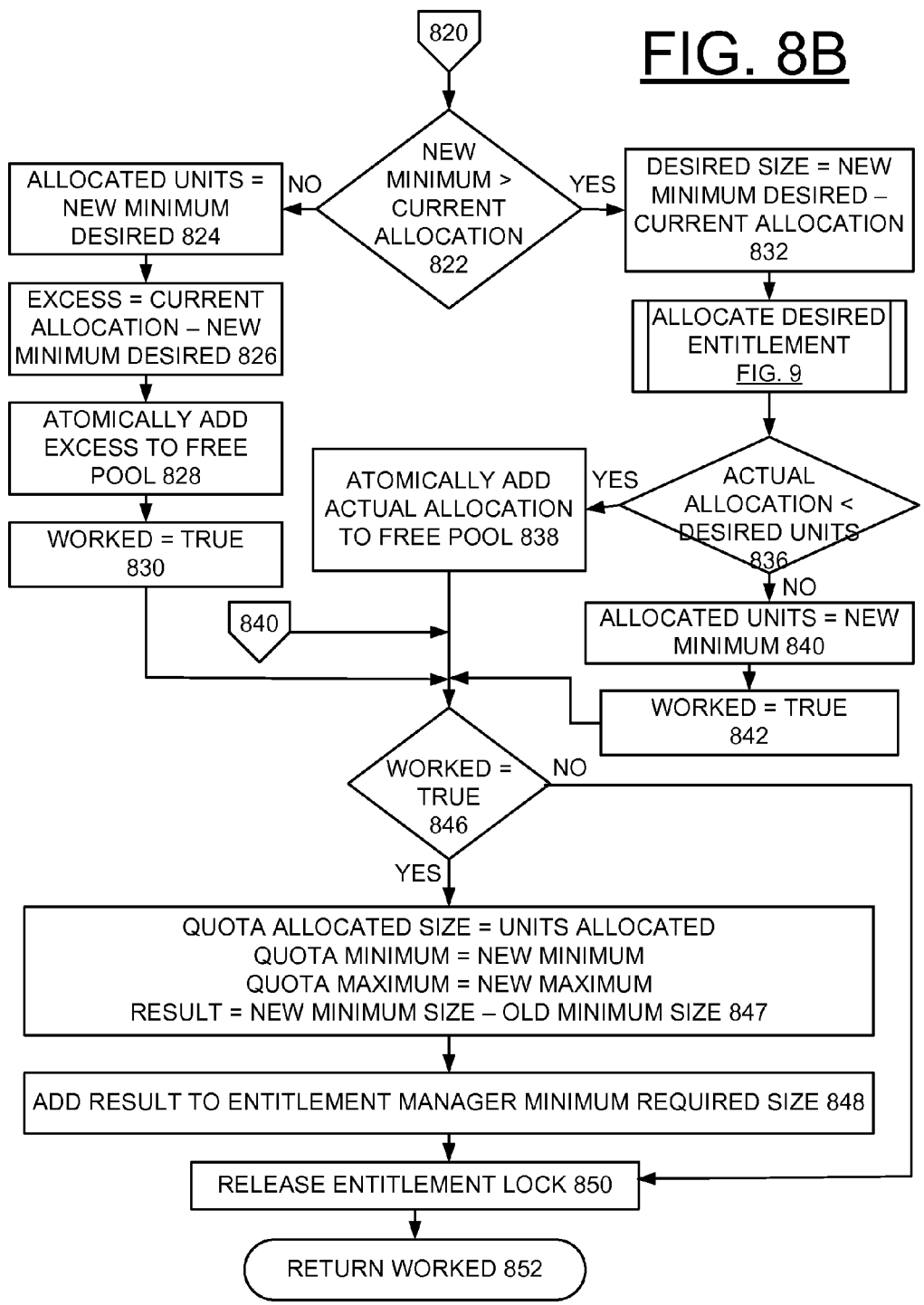

Referring now to FIGS. 8A, 8B, there are shown exemplary steps for implementing register quota in accordance with the preferred embodiment starting at a block 800. The Adapter Device driver calls Reallocate Quota subroutine of FIGS. 8A, 8B on the Entitlement Manager to change the minimum and maximum allocation values of a Quota that has already been registered. As a side effect, the Entitlement Manager also tries to adjust the entitlement allocated to the Quota to match the new minimum. All Quota entitlement values remain unchanged if this fails. It is the responsibility of the Adapter Driver to ensure that this request is made while no I/O request activity is in progress.

The Entitlement Manager first acquires its entitlement lock to serialize access to its data members as indicated at a block 802, and then sets a local worked flag to FALSE as indicated at a block 804 and a local units allocated variable to 0 as indicated at a block 806. The Entitlement Manager then determines if the Quota has been registered previously as indicated at a decision block 808, and if not branches to FIG. 8B, logic entry point 840. The Entitlement Manager determines if I/O memory is capped as indicated at a decision block 810, and if not sets allocated units to the maximum value 812, sets the worked flag to TRUE as indicated at a block 814, and branches to FIG. 8B, logic entry point 840. Otherwise I/O memory is capped so the Entitlement Manager sets the Quota's allocate in progress flag on as indicated at a block 816. The current allocated size of the quota is then used in subsequent logic, as indicated at a block 818, such as at a decision block 822 in FIG. 8B.

Referring now to FIG. 8B following entry point 820, the Entitlement Manager checks if the new minimum is greater than the current allocation as indicated at a decision block 822. As indicated at a block 824, the Entitlement Manager determines the excess entitlement held by the Quota by subtracting the new minimum set as indicated at a block 824 from the current allocated size as indicated at a block 826. If actual allocation is less than the desired units the Entitlement Manager then atomically adds the excess entitlement back into the Free Pool as indicated at a block 828 and sets the worked flag to TRUE as indicated at a block 830. Otherwise, if the new minimum desired is greater than the current Quota allocation the Entitlement Manager calculates the amount of additional entitlement required by subtracting the Quota's current allocation from the new minimum desired as indicated at block 832. The Entitlement Manager then calls Allocate Entitlement, which is illustrated in FIG. 9, to try to allocate the required amount of additional entitlement. If the actual amount allocated is less than the additional amount required as indicated at a decision block 836, the Entitlement Manager returns the amount allocated to the Free Pool as indicated at a block 838. Otherwise, the allocated units variable is set to the new minimum value as indicated at a block 840 and the worked flag is set to TRUE as indicated at a block 842.

At logic entry point 840, the Entitlement Manager determines if the worked flag is set to TRUE as indicated at a decision block 846. If so, it updates the Quota minimum and maximum values to the new values, sets the Quota allocated size to the allocated units value, and the Entitlement Manager calculates a result of the difference between the new minimum size and the old minimum size as indicated at a block 847, where the difference will be negative if the new minimum size is less than the old minimum size. The result is added to the entitlement manager minimum required size as indicated at a block 848. Finally the Entitlement Manager releases its lock as indicated at a block 850 and returns the value of worked to the caller as indicated at a block 852.

Referring now to FIG. 9, there are shown exemplary steps for implementing allocate entitlement in accordance with the preferred embodiment starting at a block 900. The Entitlement Manager calls Allocate Entitlement subroutine of FIG. 9 when it wants to obtain unused entitlement units. The desired entitlement units may be obtained from the Free Pool or by donations of unused entitlement from the registered Quotas. The quantity of entitlement allocated can be less than the quantity desired; it is the responsibility of the caller to determine how to handle that. The Entitlement Manager lock must be held when using this logic.

Figure 10:
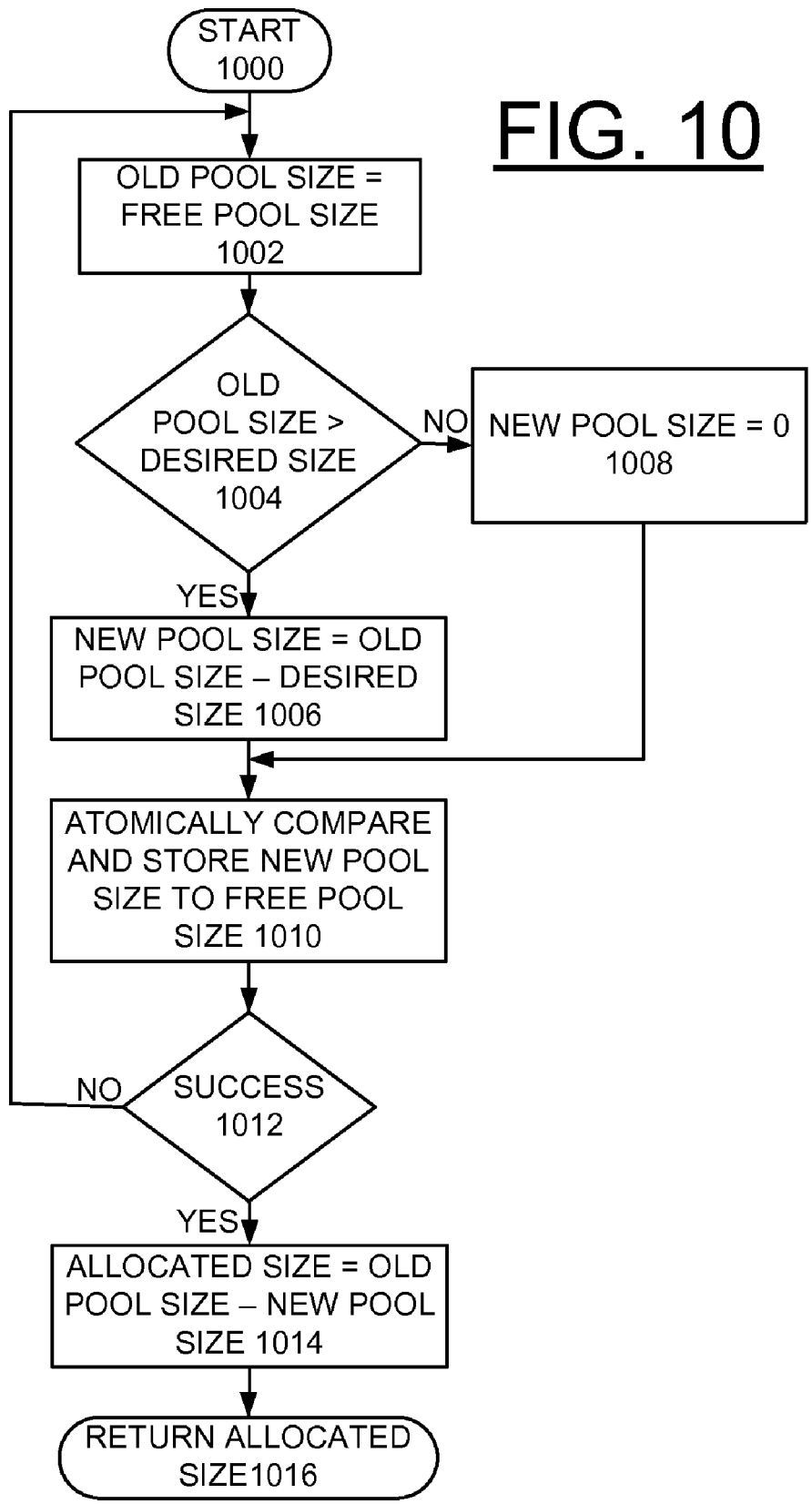
Figure 11:
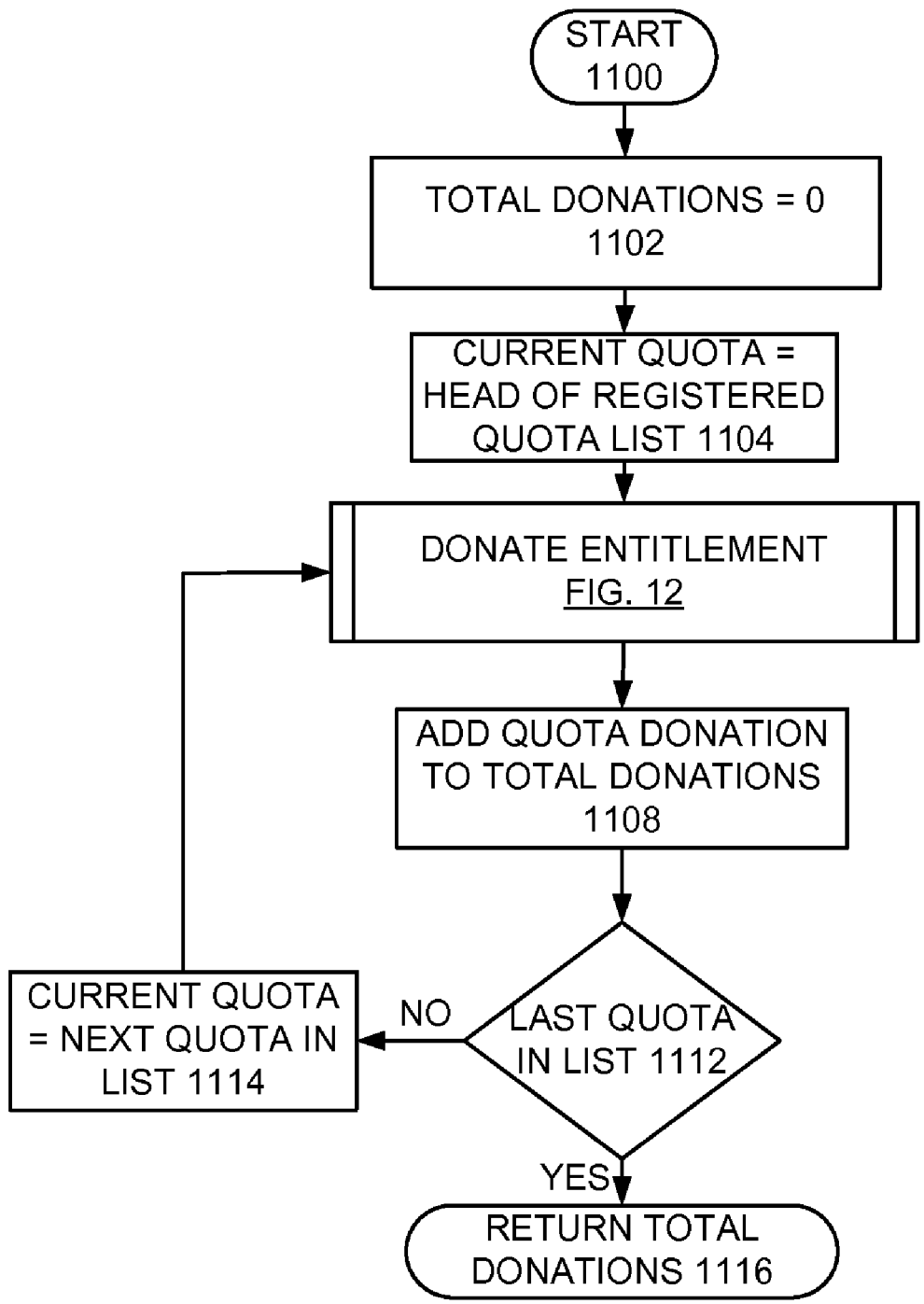

The Entitlement first calls Allocate From Free Pool, which is illustrated in FIG. 10, to obtain the desired entitlement units directly from the Free Pool. If the amount allocated from the Free Pool was not sufficient to satisfy the request as indicated at a decision block 904, the Entitlement Manager sets a donation type to all available as indicated at a block 906 and calls Ask Quotas For Donations, which is illustrated in FIG. 11, to obtain unused entitlement from the registered Quotas. The amount of donated entitlement is added to the amount allocated from the Free Pool as indicated at a block 910, which is again compared to the amount desired as indicated at a decision block 912. If the amount allocated is greater than the amount desired at decision block 912, the excess is calculated as indicated at a block 914 and atomically added to the Free Pool as indicated at a block 916 and the amount allocated is set to the amount desired as indicated at a block 918. The Entitlement Manager then returns the amount allocated to the caller as indicated at a block 920.

Referring now to FIG. 10, there are shown exemplary steps for implementing Allocation From Free Pool in accordance with the preferred embodiment starting at a block 1000. The Entitlement Manager calls Allocate From Free Pool subroutine of FIG. 10 when it wants to remove entitlement units from the Free Pool. This may be done without the Entitlement Manager lock so changes to the Free Pool must be made atomically.

The Entitlement Manager copies the current Free Pool size into an old pool size variable as indicated at a block 1002. If the old pool size is greater than the desired allocation size as indicated at a decision block 1004, the new pool size is calculated by subtracting the desired allocation from the old pool size as indicated at a block 1006. If the old pool size is not greater than the desired allocation size, the new pool size is set to 0 as indicated at a block 1008. The Entitlement Manager than uses compare and swap logic to atomically compare and store the new pool size to the Free Pool as indicated at a block 1010. If the store operation fails as indicated at a decision block 1012, the Entitlement Manager branches back to the beginning to retry the update returning to block 1002. Otherwise, the size allocated is calculated by subtracting the new pool size from the old pool size as indicated at a block 1014. The allocated size is then returned to the caller as indicated at a block 1016.

Referring now to FIG. 11, there are shown exemplary steps for implementing Ask Quotas For Donations in accordance with the preferred embodiment starting at a block 1100. The Entitlement Manager calls the Ask Quotas For Donations subroutine of FIG. 11 whenever it wants to reclaim unused entitlement units from the registered Quotas. A donation type parameter is used to define how aggressive the Quotas should be when returning entitlement, where All Available means to immediately return all unused entitlement while Iterative means to return only a fraction of unused entitlement. The Entitlement Manager lock must be held when this logic is used.

As indicated at a block 1102, the Entitlement Manager sets a local total donations field to 0 and sets the current Quota to be the first Quota in the registered list as indicated at a block 1104. The Entitlement Manager then calls Donate Entitlement, which is illustrated in FIG. 12, on the current Quota passing the donation type parameter to obtain unused entitlement from that Quota. The Entitlement Manager adds the donation returned to the total donations as indicated at a block 1208, then determines if this is the last Quota in the list as indicated at a decision block 1112. If not, it sets the current Quota to the next Quota in the list as indicated at a block 1114 and continues obtaining donations. After all registered Quotas have been asked for donations, the Entitlement Manager returns the total amount of entitlement donated to the caller as indicated at a block 1116.

Figure 12B:
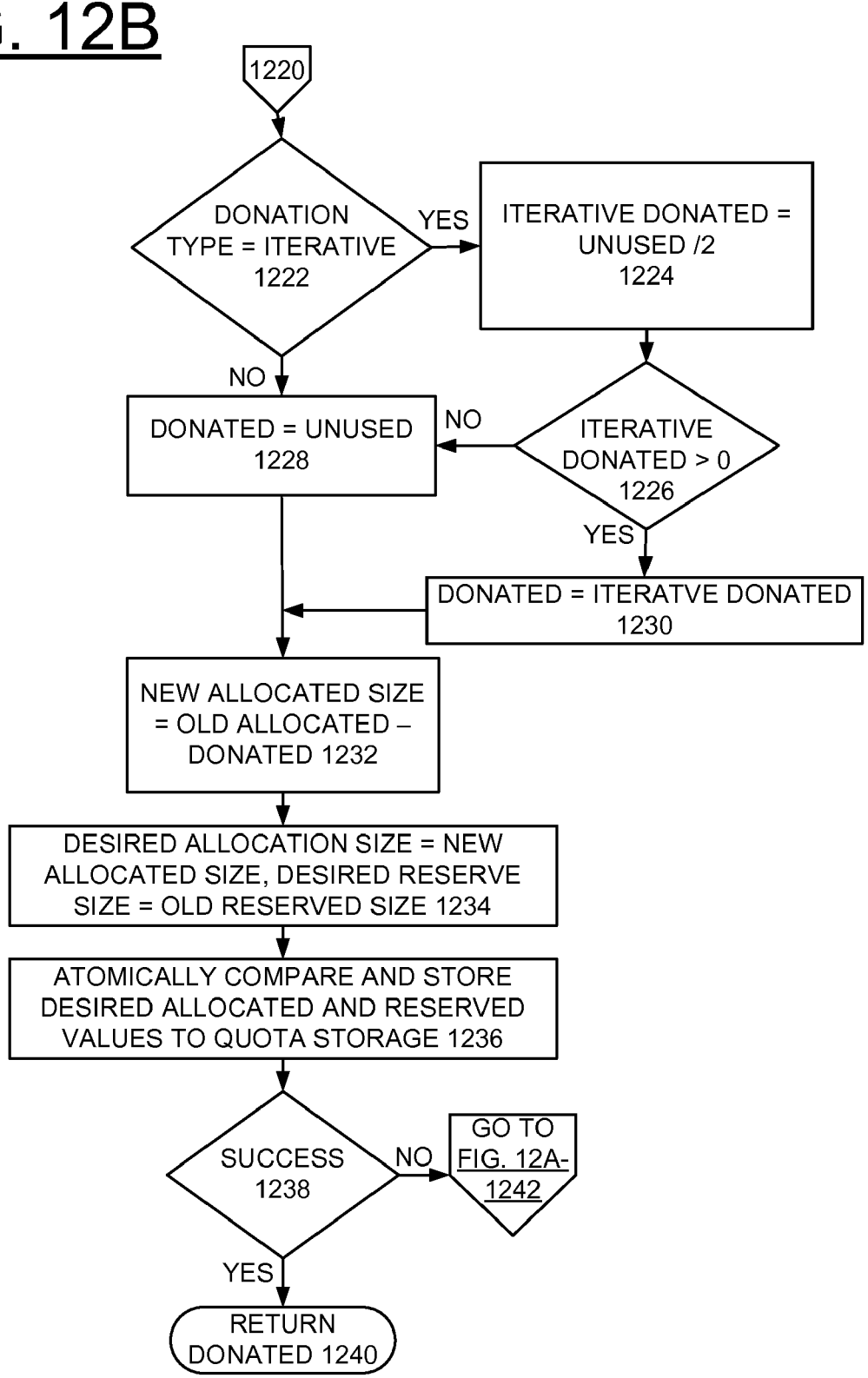

Referring now to FIGS. 12A, 12B, there are shown exemplary steps for implementing Donate Entitlement in accordance with the preferred embodiment starting at a block 1200. The Donate Entitlement logic in the Quota is called by the Entitlement Manager to return unused entitlement based on the donation type, where Unused refers to the amount of entitlement allocated by the Quota that has not been reserved and is greater than the Quota minimum. The portion of unused entitlement returned depends upon the donation type, for example, All Available returns all unused entitlement while Iterative only returns half of the unused entitlement. The Entitlement Manager lock must be held when using the Donate Entitlement logic.

Referring to FIG. 12A, checking for allocate in progress is performed as indicated at a block 1202. If the Quota allocate in progress flag is on, the Quota returns 0 to the caller because this Quota is trying to allocate entitlement and the Entitlement Manager is requesting donations to satisfy this request; therefore this Quota should not donate as indicated at a block 1203. Otherwise, the Quota atomically loads its current allocated and reserved values counts, hereafter called old allocated and reserved values as indicated at a block 1204. For example, both 4-byte variables are stored in a single 8-byte storage location, which guarantees that the values loaded will not contain updates to one field without updates to the other. The Quota then sets a local donated variable to 0 as indicated at a block 1206 and copies the old reserved value loaded into an in use variable as indicated at a block 1208.

Checking for in use entitlement of less than the Quota minimum required is performed as indicated at a decision block 1210. If the amount of in use entitlement is less than the Quota minimum, the in use amount is set to the minimum required as indicated at a block 1212. Checking for old allocated size loaded of greater than the in use amount is performed as indicated at a decision block 1214. If the old allocated size loaded is not greater than the in use amount, a value of 0 is returned to the caller as indicated at a block 1203. Otherwise, the unused amount is calculated by subtracting the in use size from the old allocated size as indicated at a block 1216. Sequential operations continue following entry logic point 1220 in FIG. 12B.

Referring to FIG. 12B, checking for donation type of Iterative is performed as indicated at a decision block 1222. If the donation type is Iterative, the iterative donation size is calculated by dividing the unused size by 2 as indicated at a block 1224. If the iterative donation calculated is not greater than 0 as indicated at a decision block 1226 or the donation type is All Available as indicated at a decision block 1222, the donated size is set to the unused size as indicated at a block 1228. Otherwise the donated size is set to the iterative donation size as indicated at a block 1230.

As indicated at a block 1232, the Quota calculates the new allocated size by subtracting the donated amount from the old allocated size, and attempts to atomically store the new allocated and old reserved values to the storage containing the current allocated and reserved values as indicated at a block 1334 by using a compare and swap update as indicated at a block 1336, which must not modify either value if it fails. The store must fail without modifying storage if the current storage values do not match the old values. If the atomic update succeeds as indicated at a decision block 1238, the donated amount is returned to the caller as indicated at a block 1240.

Otherwise, the Quota branches to entry logic point 1242 in FIG. 12A to retry the donation process.

Figure 13A:
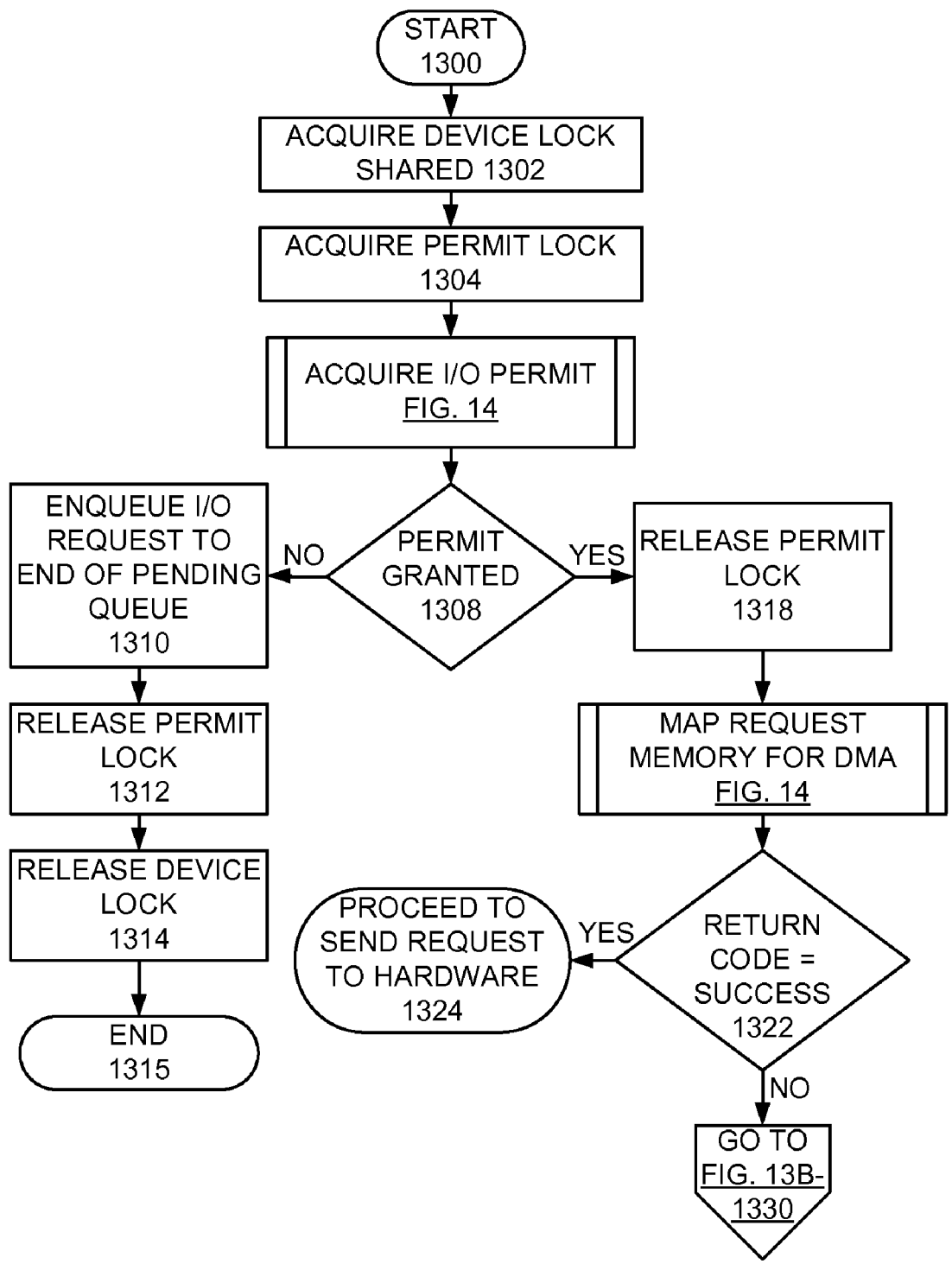
Figure 13B:
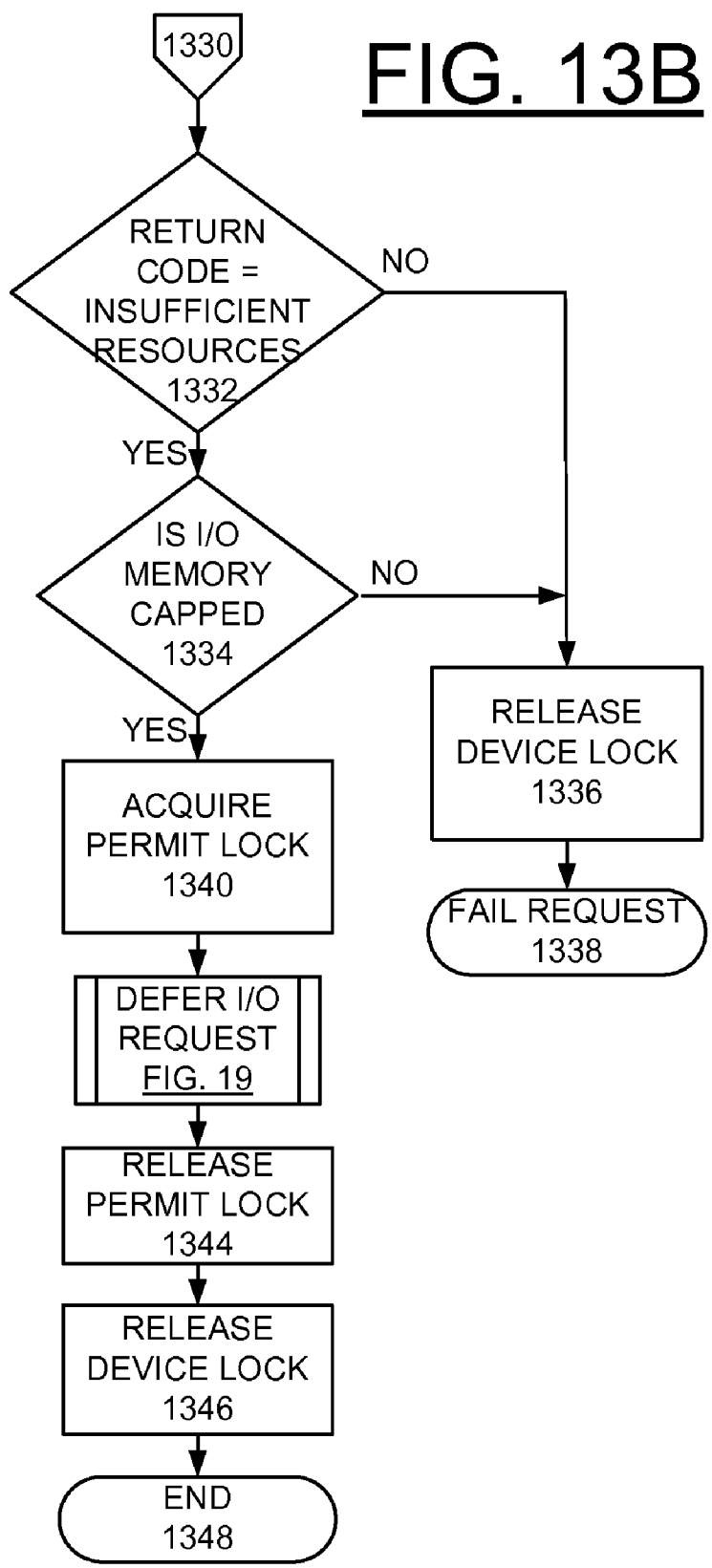

Referring now to FIGS. 13A, 13B, there are shown exemplary steps for implementing Send I/O Request to Hardware or I/O Adapter in accordance with the preferred embodiment starting at a block 1300.

Figure 14:
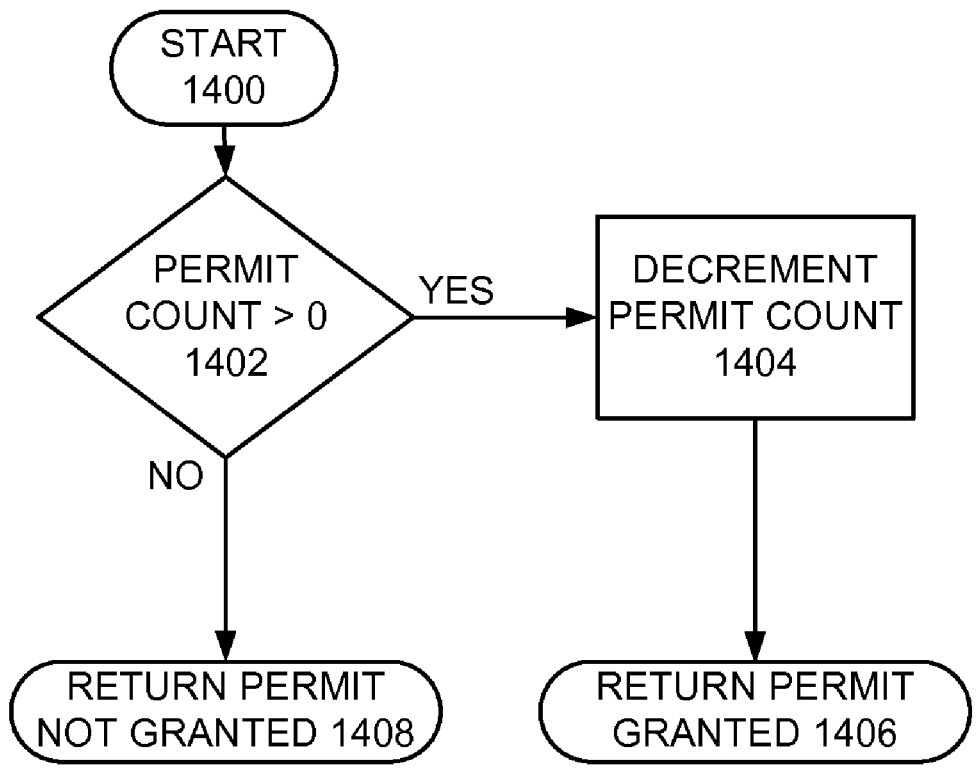

Referring to FIG. 13A, the Adapter Driver acquires a shared lock to the I/O device targeted by this I/O request to prevent unexpected changes to device-related data structures while this code segment is in progress as indicated at a block 1302. The Adapter Driver also acquires a lock protecting I/O permits as indicated at a block 1304, and then calls Acquire I/O Permit, which is illustrated in FIG. 14, to request permission to send the I/O request. If a send permit could not be granted, the Adapter Driver enqueues the I/O request to the end of the pending queue, releases the permit and device locks, and exits.

As indicated at a decision block 1308, if an I/O permit was not granted, the I/O request is enqueued to the end of the pending queue as indicated at a block 1310. The Adapter Driver then releases the permit lock as indicated at a block 1312 and releases the device lock as indicated at a block 1314 and exits as indicated at a block 1315.

As indicated at a decision block 1308, if an I/O permit was granted, the permit lock is released as indicated at a block 1316, and the Adapter Driver calls Map Request Memory For DMA, which is illustrated in FIG. 14, to add the request memory addresses into the hardware DMA tables. If the mapping operation was successful as indicated at a decision block 1322, the Adapter Driver proceeds on to perform the processing which notifies the I/O Adapter of the I/O request as indicated at a block 1324. If the mapping operation failed as indicated at a decision block 1322, the operations continue following logic entry point 1330 in FIG. 13B.

Figure 19:
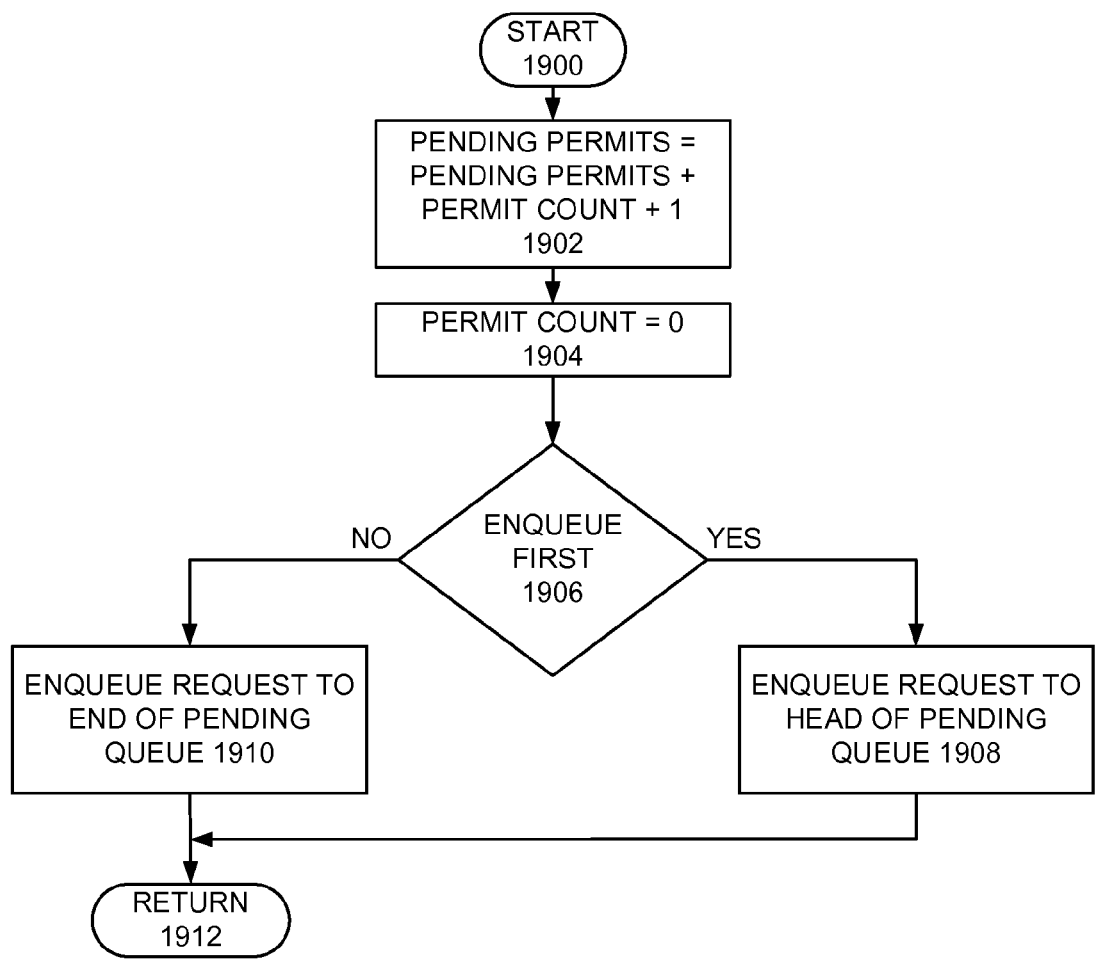

Referring to FIG. 13B, the Adapter Driver checks the response code for an Insufficient Resources value as indicated at a decision block 1332 and also if this value is expected, should only occur if I/O memory is capped, as indicated at a decision block 1334. If either condition is false the Adapter Driver unlocks the device lock as indicated at a block 1336 and fails the I/O request as indicated at a block 1338. Otherwise, the Adapter Driver acquires the permit lock again as indicated at a block 1340 and calls Defer I/O Request, which is illustrated in FIG. 19 to enqueue the request at the end of the pending queue and to prevent other requests from being sent until the pending requests can be successfully retried. The Adapter Driver then releases the permit lock as indicated at a block 1344 and releases the device lock as indicated at a block 1346 and exits as indicated at a block 1348.

Referring now to FIG. 14, there are shown exemplary steps for implementing Acquire I/O Permit in accordance with the preferred embodiment starting at a block 1400. The Acquire I/O Permit logic is an example of how an Adapter Driver may be granted permission to send an I/O request to the I/O Adapter. The Acquire I/O Permit logic is conventional logic, and is used when I/O requests are sent to the I/O Adapter.

As indicated at a decision block 1402, if the Adapter Driver permit count is greater than 0, the permit count is decremented by 1 as indicated at a block 1404. Then permission granted status is returned to the caller as indicated at a block 1406. Otherwise if the Adapter Driver permit count is not greater than 0, then permission not granted status is returned to the caller as indicated at a block 1408.

Figure 15:
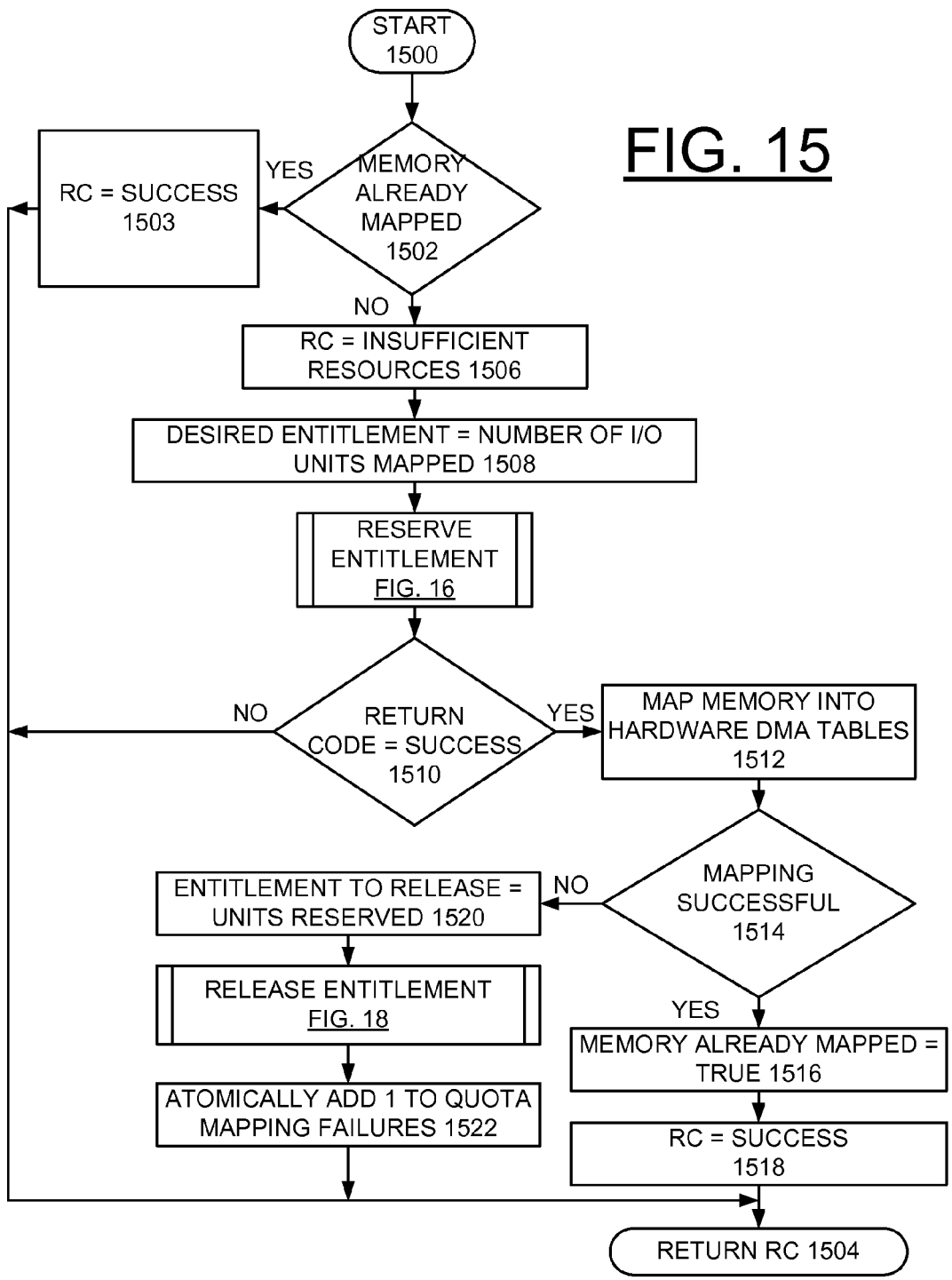

Referring now to FIG. 15, there are shown exemplary steps for implementing Map Request Memory for DMA in accordance with the preferred embodiment starting at a block 1500.

FIG. 15 provides an example of the logic used by the preferred embodiment to map I/O request memory for DMA by the Adapter Driver.

Figure 16:
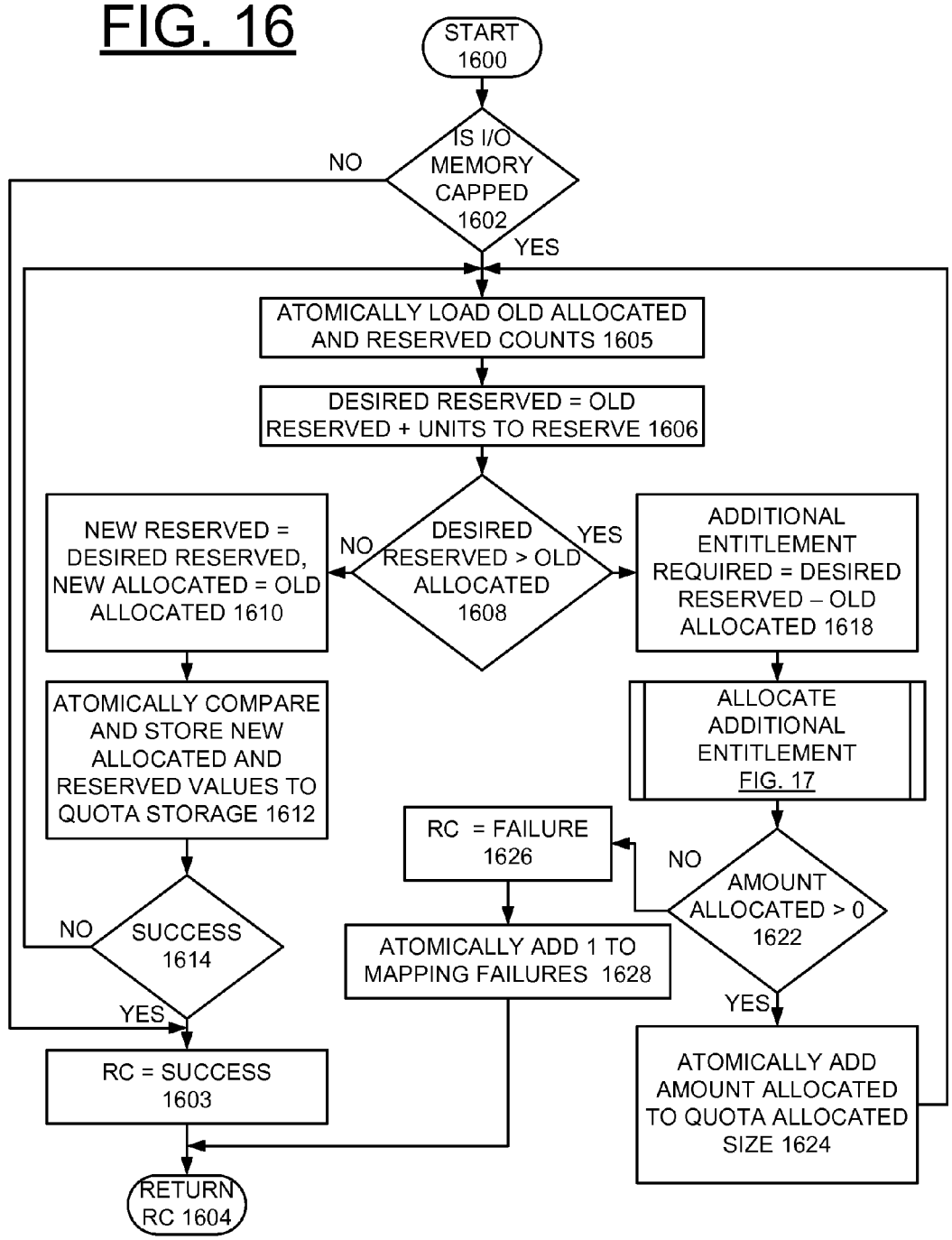
Figure 18:
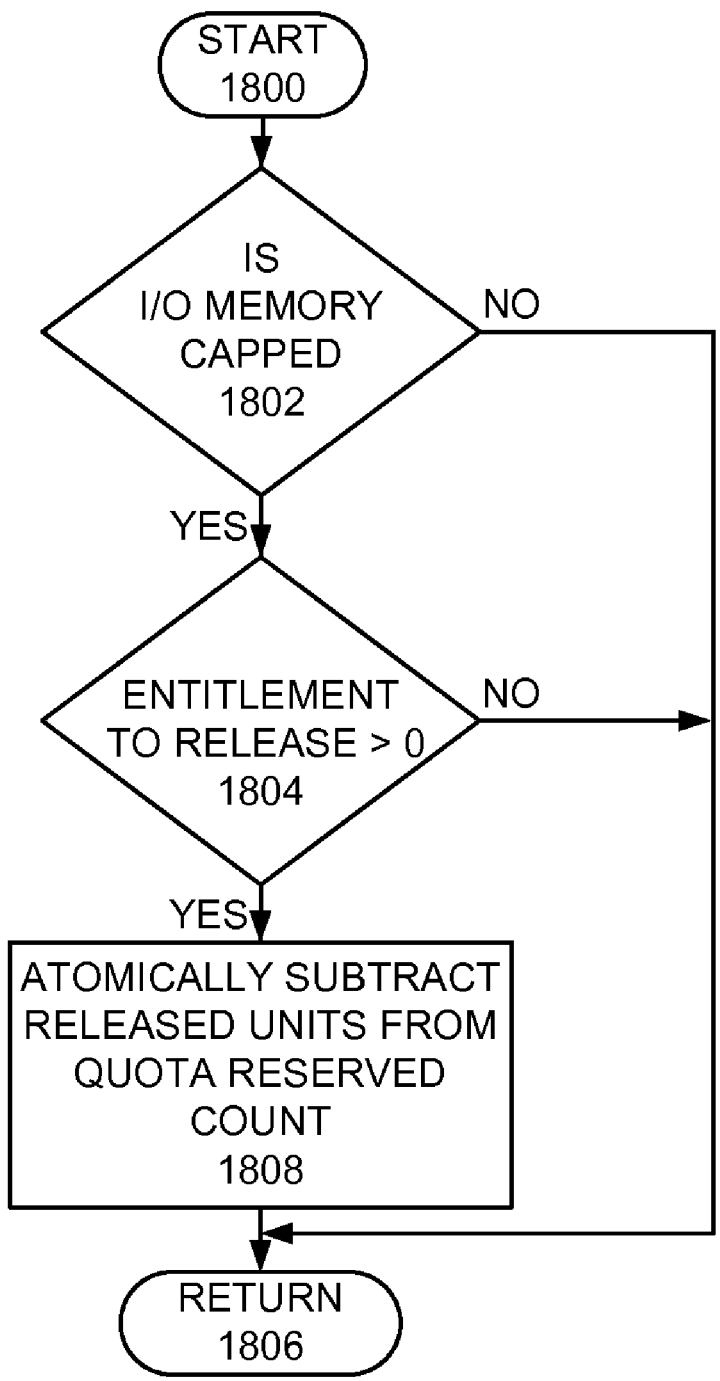

As indicated at a decision block 1502, if the I/O request memory already mapped flag is on, then a response code of Success is set as indicated at a block 1503 and returned to the caller 1504. Otherwise, then the response code of Insufficient Resources is set as indicated at a block 1506 and the desired amount of entitlement to reserve is set to the number of discrete pages to be mapped as I/O request memory as indicated at a block 1508. The I/O request then calls Reserve Entitlement, which is illustrated in FIG. 16, on its Adapter Driver's Quota. If the desired amount of entitlement was not reserved as indicated at a decision block 1510, a response code of Insufficient Resource is returned to the caller at block 1504. If the desired amount of entitlement was reserved as indicated at decision block 1510, an attempt is made to add the I/O memory pages to the hardware DMA tables as indicated at a block 1512. If this is successful as indicated at a decision block 1514, the memory already mapped flag is set as indicated at a block 1516, and the response code of Success is set as indicated at a block 1518 and returned to the caller at block 1504. Otherwise, release the entitlement is set to units reserved as indicated at a block 1520 and Release Entitlement, which is illustrated in FIG. 18 is called on the Quota to release the entitlement that was reserved and the Quota mapping failure count is atomically incremented by 1 as indicated at a block 1522. The response code of Insufficient Resources is then returned to the caller at block 1504.

Referring now to FIG. 16, there are shown exemplary steps for implementing Reserve Entitlement in accordance with the preferred embodiment starting at a block 1600. An I/O request calls Reserve Entitlement of FIG. 16 when it wishes to acquire the entitlement necessary to map a portion of memory for DMA. First the Quota determines if the I/O memory mode is capped as indicated at a decision block 1602, and if not it sets the return code status of Success as indicated at a block 1603 and simply returns the status of Success to the caller as indicated at a block 1604. If I/O memory is capped, the Quota atomically loads the current values of its allocated and reserved counts, hereafter called old values as indicated at a block 1605. The new reserved value is calculated by adding the old reserved value to the number of units to reserve parameter as indicated at a block 1606.

Checking if the calculated new reserved value is greater than the old allocated county value is performed as indicated at a decision block 1608. If the new reserved value is not greater than the old allocated value, the Quota sets the old allocated and new reserved values as indicated at a block 1610 and attempts to atomically store the old allocated and new reserved values to the storage containing the current allocated and reserved counts using a compare and swap update, which must not modify either variable if it fails as indicated at a block 1612. If the store succeeds as indicated at a decision block 1614, the Quota sets the return code status of Success at block 1603 and returns a status of Success to the caller at block 1604. If the store does not succeed as indicated at decision block 1614, the Quota branches to block 1605 to retry the reserve operation.

Figure 17:
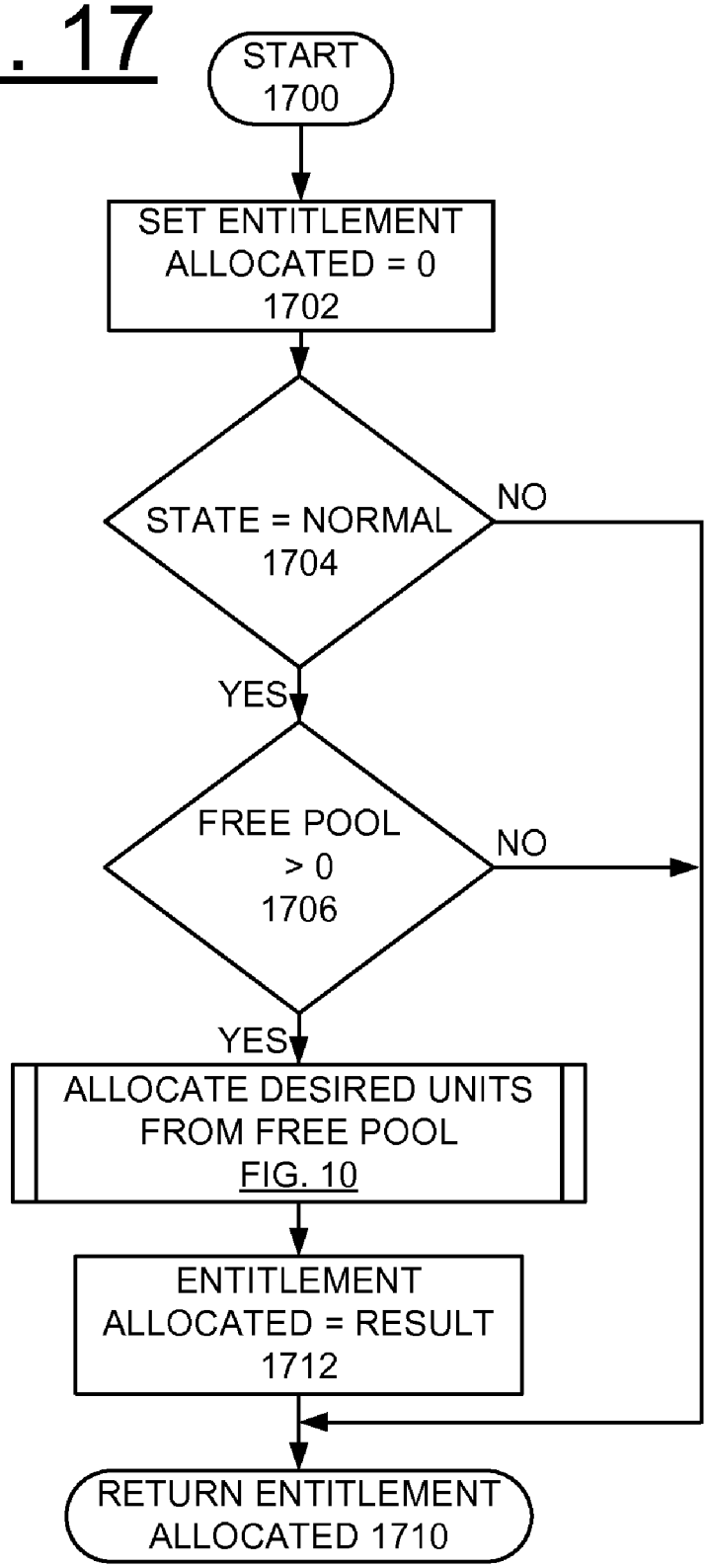

If the new reserved value is greater than the old allocated value as indicated at decision block 1608, the Quota determines the amount of additional entitlement required to satisfy the request as indicated at a block 1618 and calls Allocate Additional Entitlement, which is illustrated in FIG. 17, to attempt to obtain the entitlement needed. If the entitlement allocated is greater than 0 as indicated at a decision block 1622, the Quota atomically adds this amount to the current allocated count as indicated at a block 1624 and branches to block 1605 to retry the reserve operation. Otherwise, if the amount allocated is not greater than 0 as indicated at a decision block 1622, the Quota sets the return code status of Failure as indicated at a block 1626 and atomically increments the mapping failure count by 1 as indicated at a block 1628 and returns a status of Failure at block 1604.

Referring now to FIG. 17, there are shown exemplary steps for implementing Allocate Additional Entitlement in accordance with the preferred embodiment starting at a block 1700. A Quota calls Allocate Additional Entitlement of FIG. 17 on the Entitlement Manager when it requires more entitlement than it currently has allocated. The entitlement is set equal to 0 as indicated at a block 1702. Checking if the Entitlement Manager state is Normal is performed as indicated at a decision block 1704, then checking if the Free Pool size is greater than 0 is performed as indicated at a decision block 1706. If the Entitlement Manager state is not Normal or the Free Pool size is equal to 0, the Entitlement Manager returns 0 to the caller as indicated at a block 1710. Otherwise, the Entitlement Manager calls Allocate From Free Pool, which is illustrated in FIG. 10, to obtain the desired amount of entitlement from the Free Pool. The result is set for amount of entitlement allocated from the Free Pool as indicated at a block 1712, and then returned to the caller at block 1710.

Referring now to FIG. 18, there are shown exemplary steps for implementing Release Entitlement in accordance with the preferred embodiment starting at a block 1800. An I/O request calls Release Entitlement of FIG. 18 when it has removed its I/O memory from the hardware DMA tables and is returning the corresponding entitlement to the Quota. The entitlement being released is passed in as a parameter. Checking if the I/O memory mode is capped is performed as indicated at a decision block 1802, then checking if entitlement being released is greater than 0 is performed as indicated at a decision block 1804. If the I/O memory mode is not capped or the amount of entitlement being released is not greater than 0, the Quota simply returns to the caller as indicated at a block 1806. Otherwise, the Quota atomically subtracts the entitlement units being released from the current reserved count, leaving the allocated count unchanged, as indicated at a block 1808 and then returning to the caller at block 1806.

Referring now to FIG. 19, there are shown exemplary steps for implementing Defer I/O Request in accordance with the preferred embodiment starting at a block 1900. Defer I/O Request of FIG. 19 is an example of logic an Adapter Driver may use when it wishes to defer a pending I/O request for later retry. This logic is conventional logic used to defer requests, which cannot obtain the entitlement needed before mapping I/O request memory for DMA. The I/O request to defer and an enqueue first or last flag are passed as parameters. The logic is only used while holding the permit lock and after acquiring an I/O permit.

As indicated at a block 1902, the Adapter Driver calculates the pending permits count to be the current pending permits value+the current permits value+1. The current permit count is then set to 0 as indicated at a block 1904. The Adapter Driver then determines if the enqueue first option is being used as indicated at a decision block 1906, and if so the deferred I/O request is enqueued to the head of the pending queue as indicated at a block 1908. Otherwise the I/O request is enqueued at the end of the pending queue as indicated at a block 1910. The Adapter Driver then returns to the caller as indicated at a block 1912.

Figure 20:
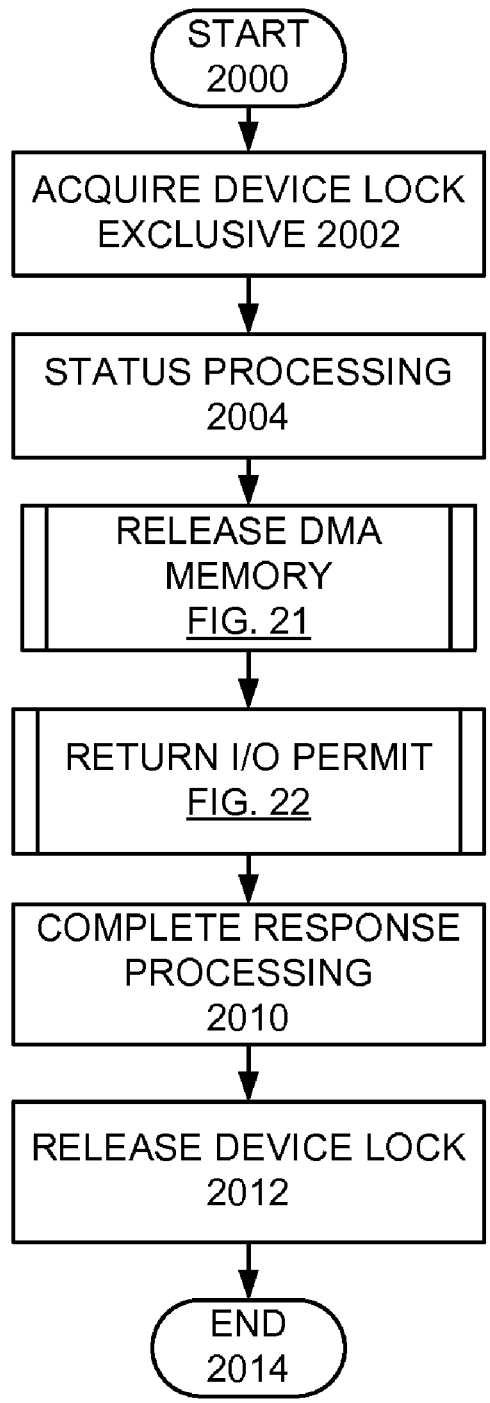

Referring now to FIG. 20, there are shown exemplary steps for implementing Process I/O Response in accordance with the preferred embodiment starting at a block 2000. Process I/O Response of FIG. 20 is an example of logic an Adapter Driver may use when it receives notification from the I/O Adapter that a particular I/O request has completed. Much of this logic is implementation dependent and FIG. 20 provides an example implementation to manage releasing entitlement used by an I/O request.

Figure 21:
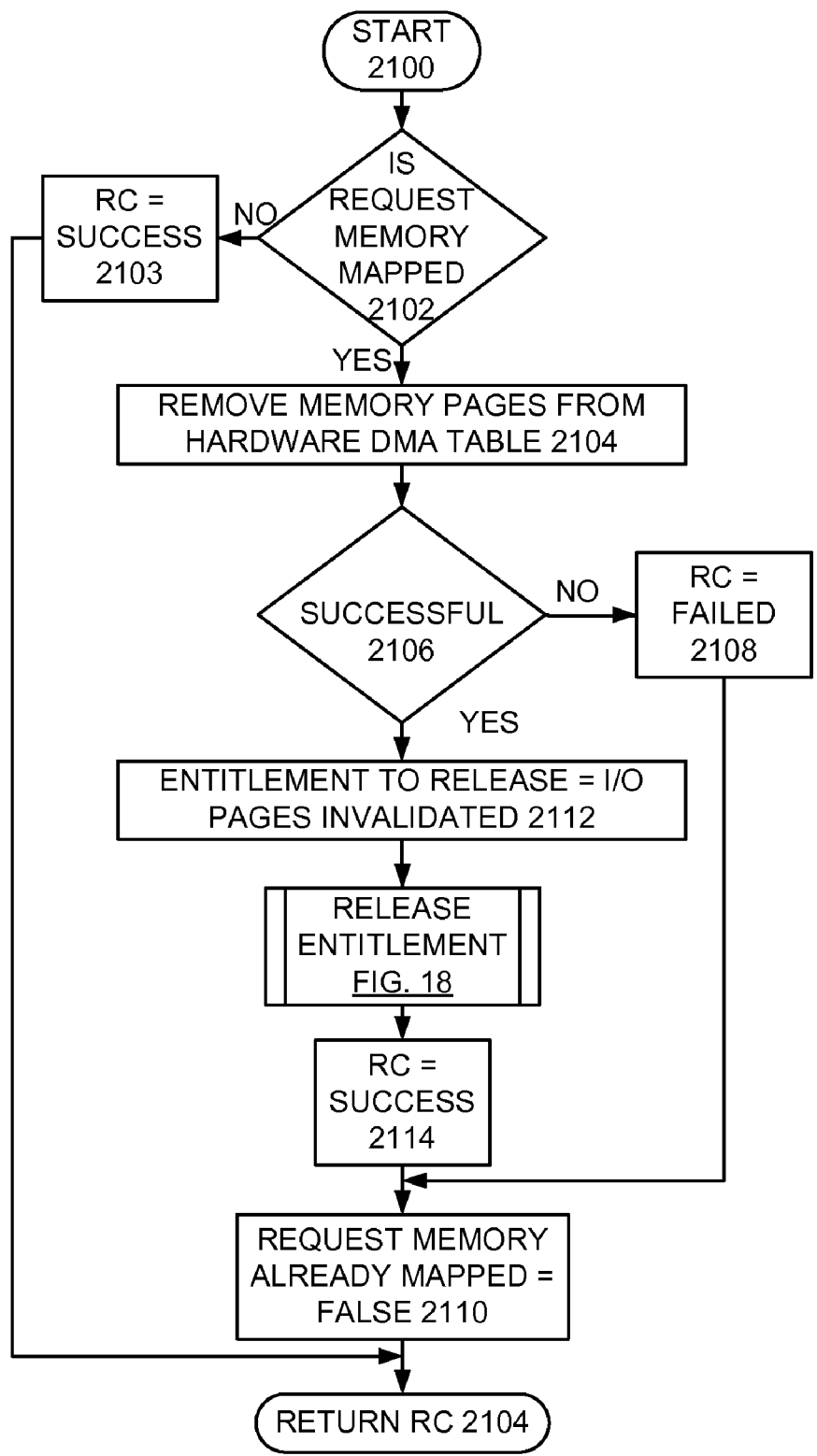
Figure 22:
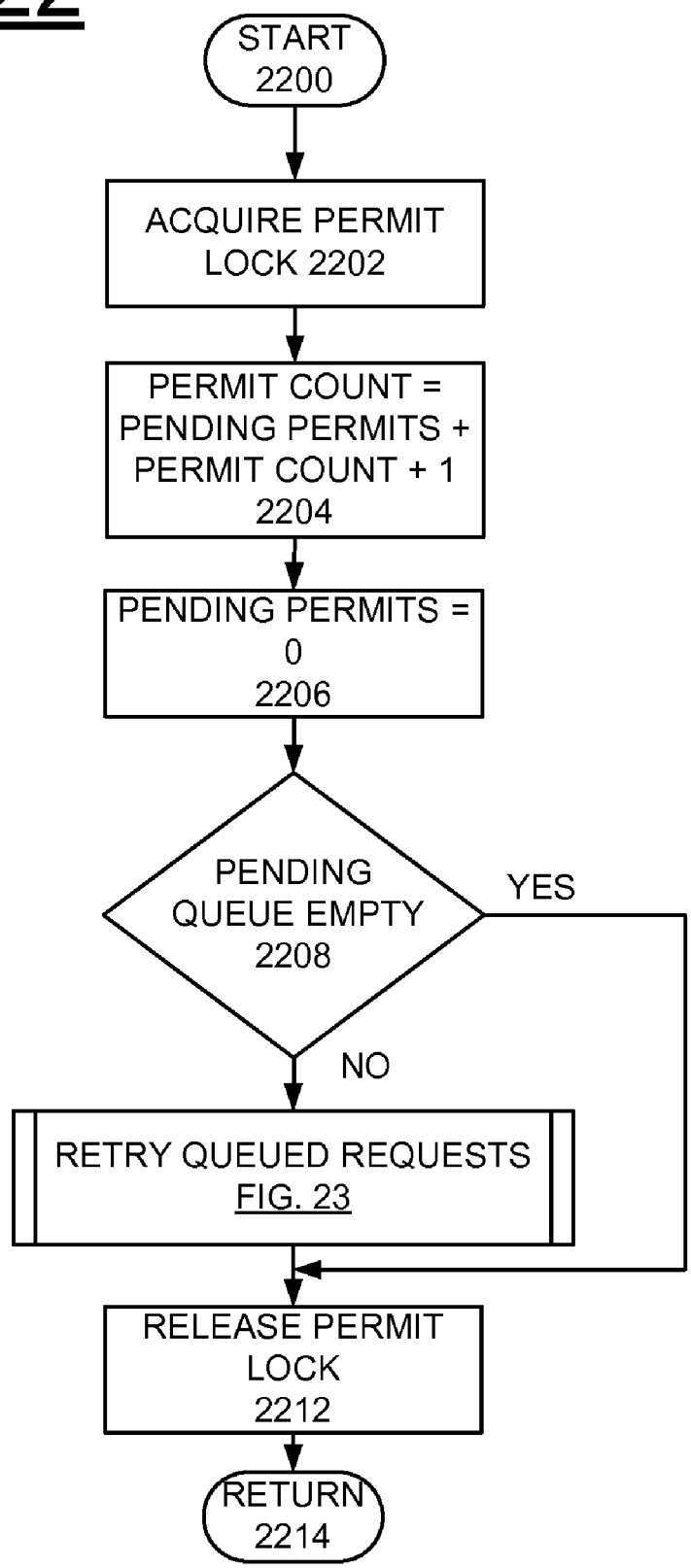

As indicated at a block 2002, the Adapter Driver obtains an exclusive lock to the data structures representing the I/O device associated with the I/O request. The Adapter Device driver examines the I/O response data to determine completion status as indicated at a block 2004, then calls Release DMA Memory, which is illustrated in FIG. 21, to remove I/O request memory from the hardware DMA tables. Following this, the Adapter Driver calls Return I/O Permit, which is illustrated in FIG. 22 to release its permit for this request, which will trigger pending I/O requests to be retried. The Adapter Driver completes any additional processing of the I/O response that may be needed as indicated at a block 2010 before releasing the device lock as indicated at a block 2012 and returning to the caller as indicated at a block 2014.

Referring now to FIG. 21, there are shown exemplary steps for implementing Release DMA Memory in accordance with the preferred embodiment starting at a block 2100. The Adapter Driver calls Release DMA Memory of FIG. 21 to remove I/O request memory pages from the hardware DMA tables and to release the corresponding entitlement. The completed I/O request is passed as a parameter.

If the I/O request memory has not been mapped as indicated at a decision block 2102, the Adapter Driver sets the return code status of Success as indicated at a block 2103 and returns Success to the caller as indicated at a block 2104. Otherwise, the Adapter Driver removes the I/O request memory pages from the hardware DMA tables as indicated at a block 2105, where the hypervisor is called to invalidate table entries in the preferred embodiment. If this does not complete successfully as indicated at a decision block 2106, the Adapter Driver sets the return code status of Failed as indicated at a block 2108, turns off the memory already mapped flag in the I/O request as indicated at a block 2110 and returns Failure to the caller at block 2104. Otherwise, the Adapter Driver sets the entitlement to release equal to I/O pages invalidated as indicated at a block 2112, then calls Release Entitlement, which is illustrated in FIG. 18, passing the number of I/O memory pages invalidated as the parameter. The Adapter Driver sets the return code status of Success as indicated at a block 2114. The Adapter Driver then turns off the memory already mapped flag in the I/O Request at block 2110 and returns Success to the caller as indicated at a block 2104.

Referring now to FIG. 22, there are shown exemplary steps for implementing Return I/O Permit in accordance with the preferred embodiment starting at a block 2200. Return I/O Permit of FIG. 22 is an example of logic an Adapter Driver may use to complete I/O response processing and retry deferred requests. This logic is conventional and is as part of existing I/O response handling to retry requests. This logic is used for insufficient entitlement retry in accordance with the preferred embodiment.

Figure 23:
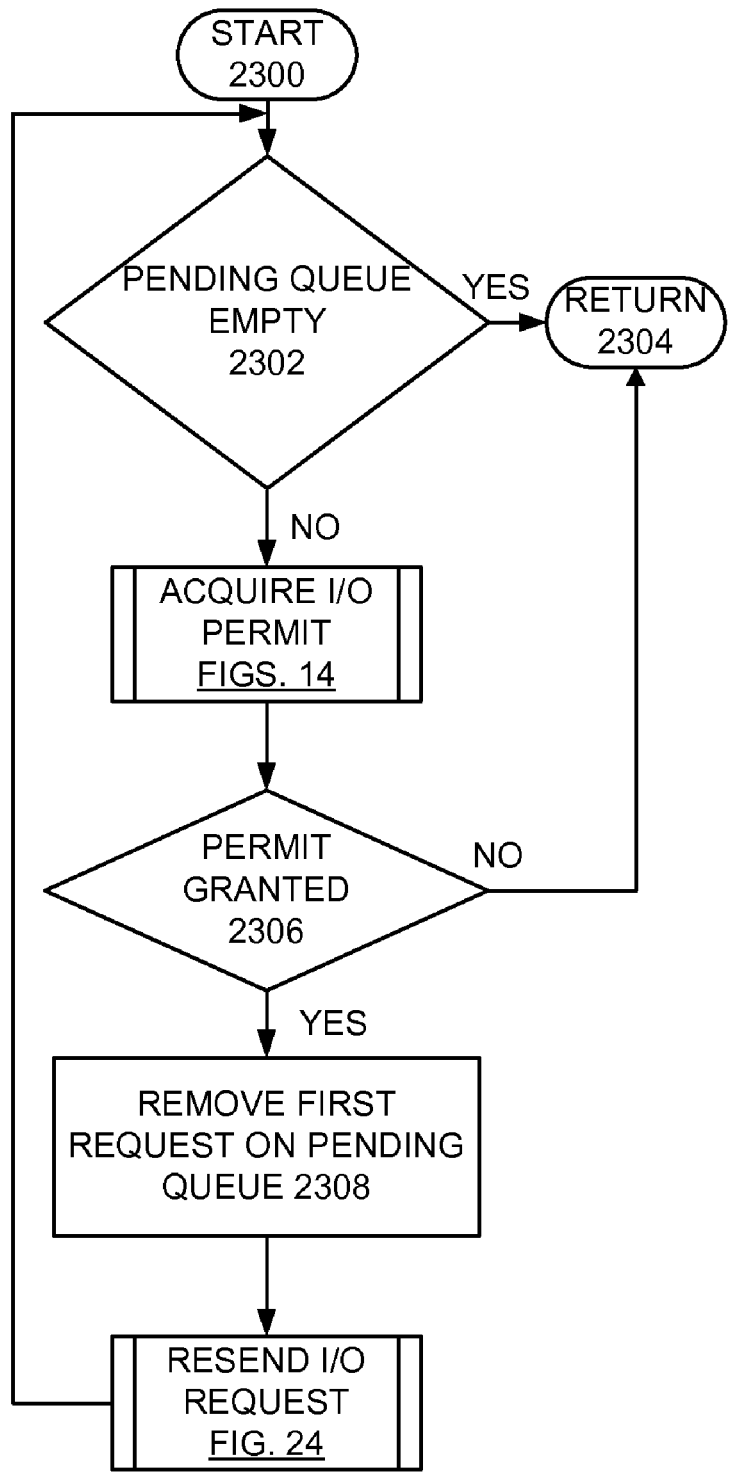

As indicated at a block 2202, the Adapter Driver acquires the permit lock, and sets the permit count equal to the pending permit count+the current permit count+1 as indicated at a block 2204. The pending permit count is then set to 0 as indicated at a block 2206. Following this, the Adapter Driver determines if the pending request queue is empty as indicated at a decision block 2208. If the pending request queue is not empty, the Adapter Driver calls Retry Queued Requests, which is illustrated in FIG. 23. The Adapter Driver then releases the permit lock as indicated at a block 2212 and returns to the caller as indicated at a block 2214.

Referring now to FIG. 23, there are shown exemplary steps for implementing Retry Queued Requests in accordance with the preferred embodiment starting at a block 2300. Retry Queued Requests of FIG. 23 is an example of logic an Adapter Driver may use to retry I/O requests that were previously deferred. This logic is conventional logic. This logic is used for insufficient entitlement retry in accordance with the preferred embodiment. The logic is used while holding the I/O permit lock.

Figure 24:
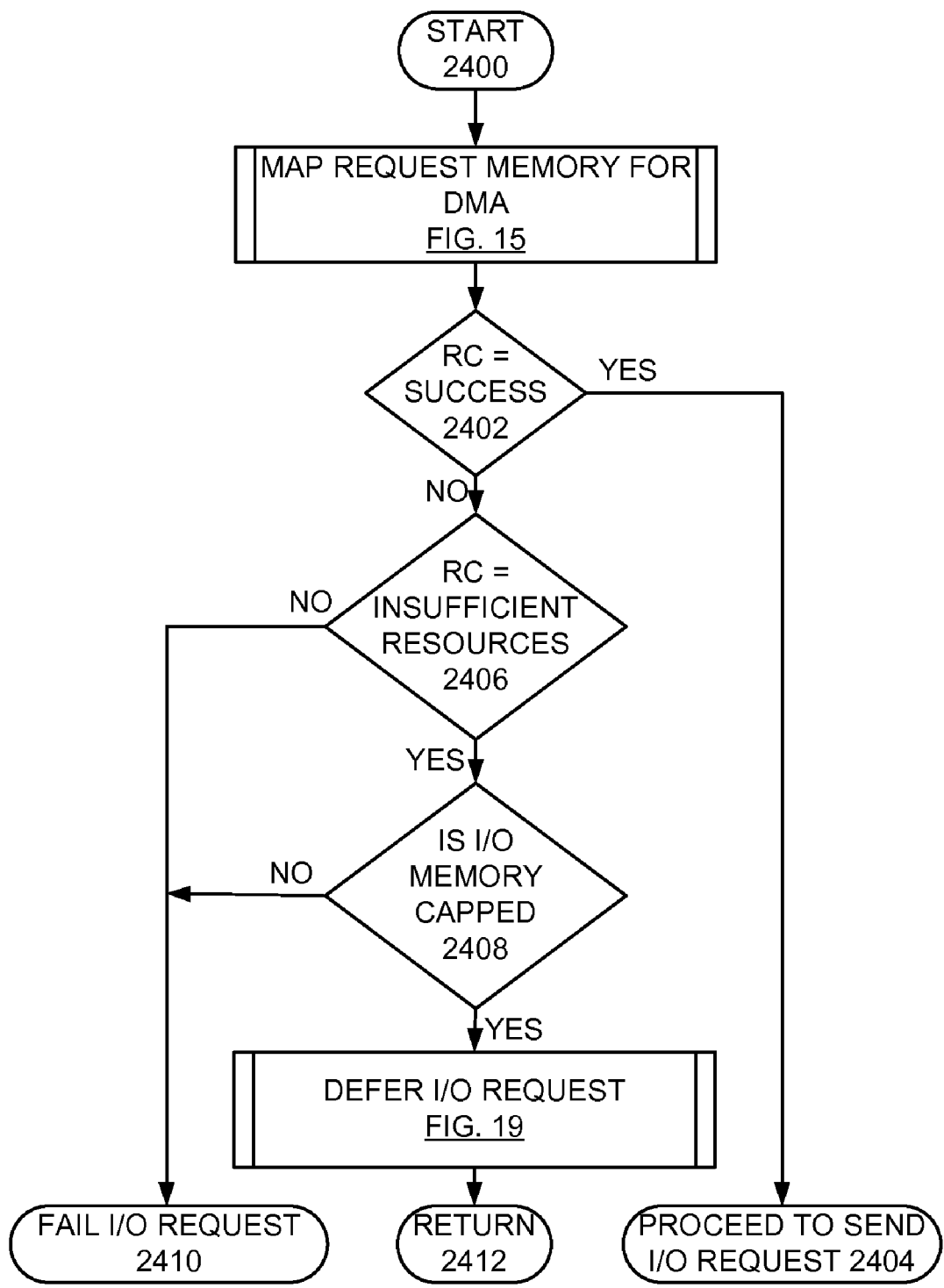

As indicated at a decision block 2302, the Adapter Driver determines if the pending queue is empty. If the queue is empty, the Adapter Driver returns to the caller as indicated at a block 2304. Otherwise, the Adapter Driver calls Acquire I/O Permit, which is illustrated in FIG. 14, to request permission to send the I/O request. If a permit is not granted as indicated at a decision block 2306, the Adapter Driver returns to the caller at block 2304. Otherwise if a permit is granted the Adapter Driver removes the first I/O request from the pending queue and calls Resend I/O Request, which is illustrated in FIG. 24. The Adapter Driver then loops back to decision block 2302 to determine if the pending queue is empty and continues.

Referring now to FIG. 24, there are shown exemplary steps for implementing Resend I/O Request in accordance with the preferred embodiment starting at a block 2400. Resend I/O Request of FIG. 24 is an example of logic an Adapter Driver may use to retry sending a particular I/O request to the I/O Adapter. Most of this logic is conventional logic. This logic is used to handle failures to map request memory for DMA when retrying a deferred I/O request. This logic is used for insufficient entitlement retry in accordance with the preferred embodiment.

First the Adapter Driver calls Map Request Memory For DMA, which is illustrated in FIG. 15, for the I/O request being retried. If the mapping is successful as indicated at a decision block 2402, the Adapter Driver proceeds on to notify the I/O Adapter of the I/O request as indicated at a block 2404 and returns to the caller. If the mapping was not successful at decision block 2402 and the response code was not Insufficient Resources, as indicated at a decision block 2406 or that response code was unexpected because the I/O memory mode is not capped as indicated at a decision block 2408, the Adapter Driver proceeds to fail the I/O request as indicated at a block 2410 and return to the caller. Otherwise if the mapping failed due to insufficient entitlement and the Adapter Driver calls Defer I/O Request, which is illustrated in FIG. 19, to re-enqueue the I/O request to the head of the pending queue and to block subsequent I/O requests from being sent to the I/O Adapter until the request can be successfully retried, and then and return to the caller as indicated at a block 2412.

Referring now to FIGS. 25A, 25B, 25C, 25D, and 25E, there are shown exemplary steps for implementing Rebalance Entitlement in accordance with the preferred embodiment starting at a block 2500. Rebalance Entitlement of FIGS. 25A, 25B, 25C, 25D, and 25E is Entitlement Manager logic that is called when a repeating timer, such as a 30 second timer expires. The Rebalance Entitlement logic determines if there are Adapter Driver Quotas that are unable to allocate as much entitlement as they desire to satisfy their I/O workload, but other Adapter Driver Quotas have consumed entitlement that they are no longer using. If this is the case, the Entitlement Manager attempts to gradually reclaim the excess entitlement from those Quotas and return it to the Free Pool where Quotas that are requesting additional allocations consume the reclaimed entitlement. The Entitlement Manager attempts to rebalance entitlement only if 1) there are at least two Quotas registered, termed eligible quotas, which indicate they can operate within a range of entitlement (max>min) and have entitlement in use, 2) at least one of these Quotas has consumed more than its minimum required entitlement allocation, and 3) the number of mapping failures reported by at least one of these Quotas within the last timer interval is outside the average number of failures experienced by the affected Quotas, for example, +/−5% of the average.

Figure 25A:
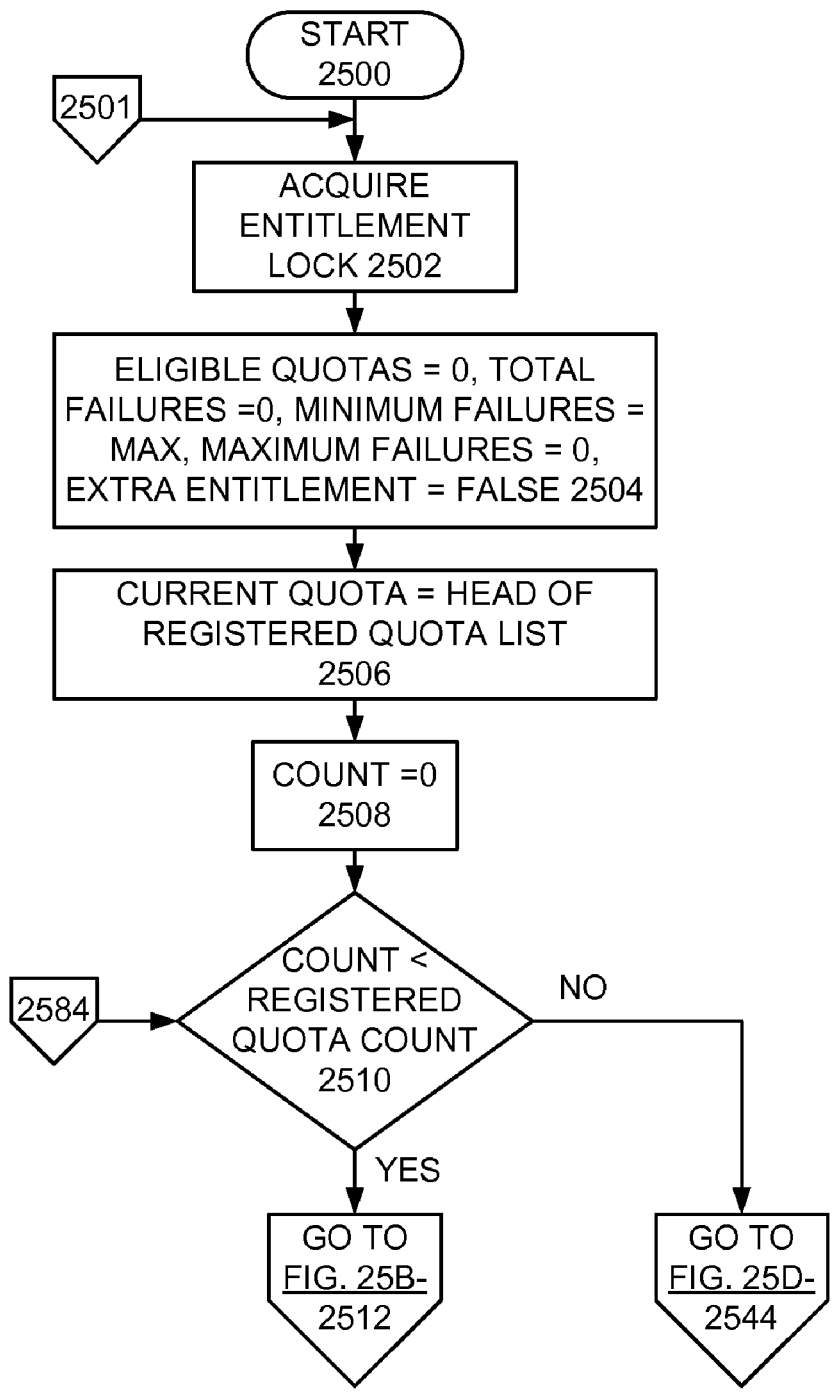

Referring now to FIG. 25A, the Rebalance Entitlement starts following the expiration of the Load Balance timer at block 2500. The Entitlement Manager acquires the entitlement lock as indicated at a block 2502, and initializes local variables setting the eligible quotas to 0, setting total failures to 0, setting minimum failures to MAX, setting maximum failures to 0, and setting extra entitlement to false as indicated at a block 2504. The Entitlement Manager sets the current Quota to the head of the registered quota list as indicated at a block 2506, and sets the count to 0 as indicated at a block 2508. The Entitlement Manager then initiates the loop through all registered Quotas as indicated at a decision block 2510, continuing following logic entry point 2512 in FIG. 25B when the count is less than the registered quota count; or alternatively continuing following logic entry point 2544 in FIG. 25D.

Figure 25B:
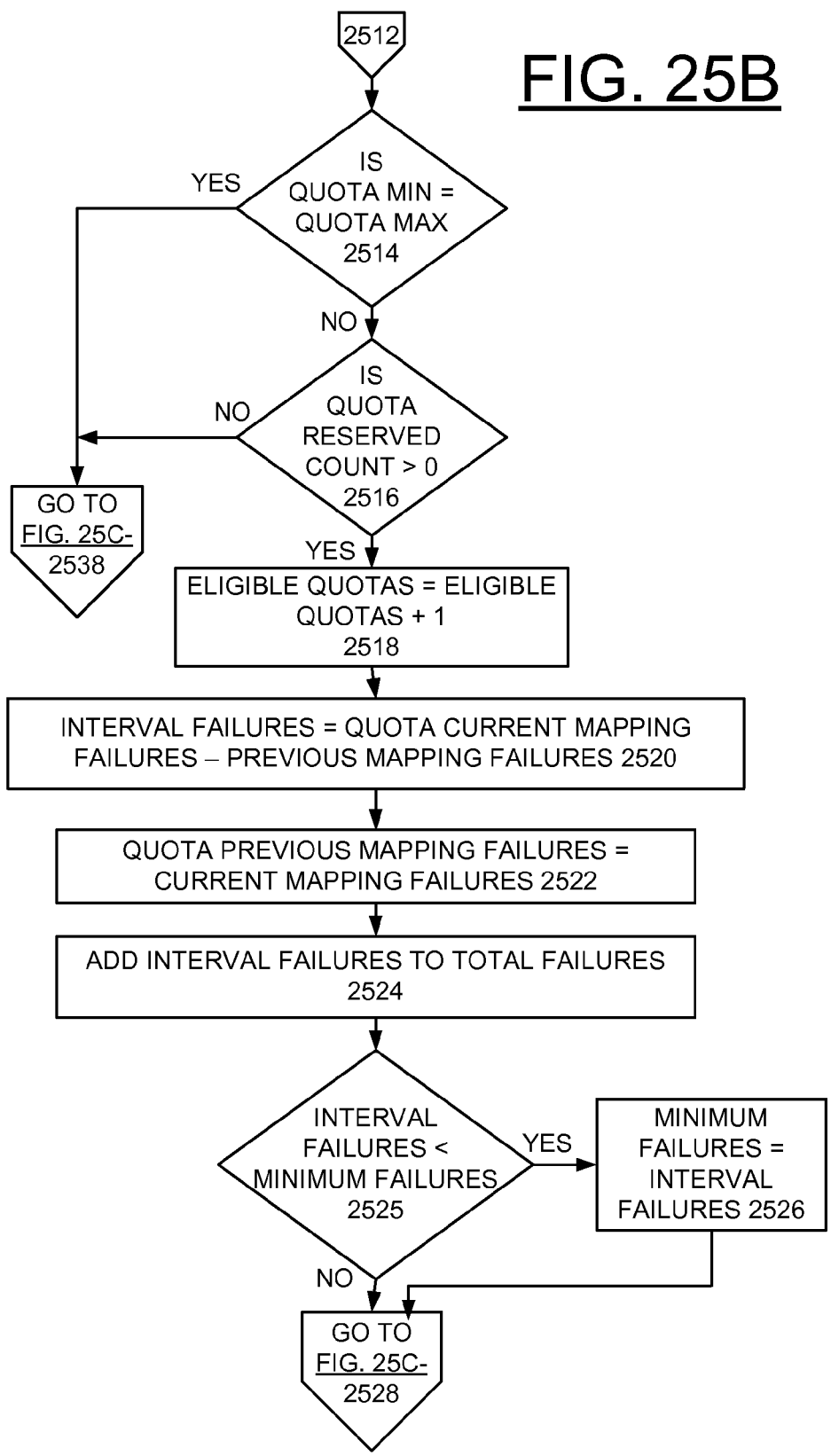
Figure 25C:
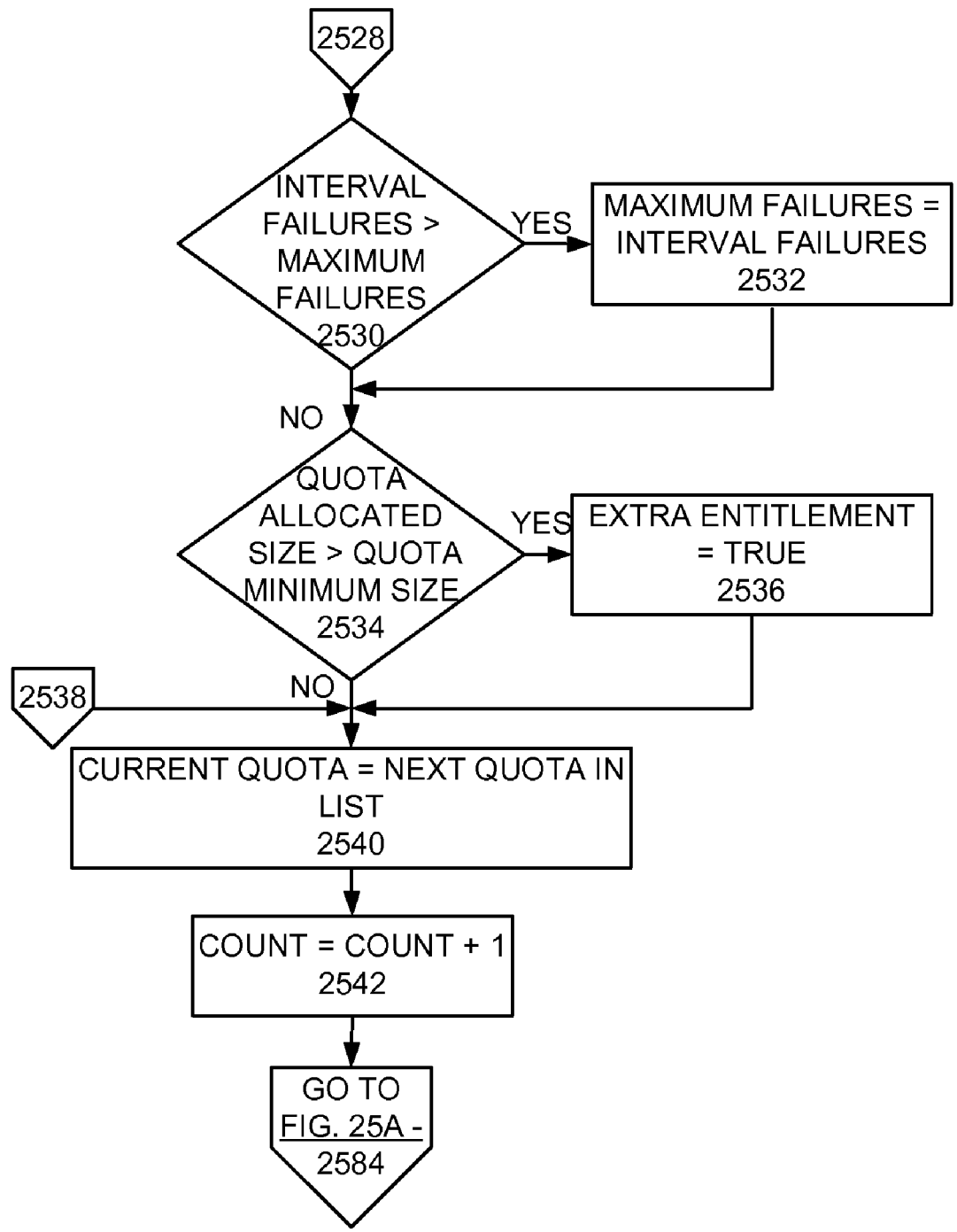

FIGS. 25B and 25C illustrate how the Entitlement Manager identifies the eligible quotas and, of those, which have consumed more than their minimum entitlement allocation. The Entitlement Manager logic to accumulate mapping failure data from the Quotas is also illustrated.

Referring now to FIG. 25B following logic entry point 2512, the Entitlement Manager checks if the quota minimum is less than the quota maximum as indicated at a decision block 2514, and checks if the quota reserved count is greater than zero as indicated at a decision block 2516 to identify the eligible quotas. The eligible quotas is set to eligible quotas incremented by one as indicated at a block 2518, and the setting interval failures to quota current mapping failures subtracting previous mapping failures as indicated at a block 2520. Then the quota previous mapping failures is set to the current mapping failures as indicated at a block 2522. Then the interval failures are added to the total failures as indicated at a block 2524. Then checking if the interval failures are less that minimum failures as indicated at a decision block 2525. If the interval failures are less that minimum failures, then the minimum failures are set to the interval failures as indicated at a block 2526. Operations continue following logic entry point 2528 in FIG. 25C. Otherwise if the quota minimum is less than the quota maximum at decision block 2514, or if the quota reserved count is not greater than zero at decision block 2516, then operations continue following logic entry point 2538 in FIG. 25C.

Referring now to FIG. 25C following logic entry point 2528, the Entitlement Manager checks if the interval failures are greater than the maximum failures as indicated at a decision block 2530. If the interval failures are greater than the maximum failures, then the maximum failures are set to the interval failures as indicated at a block 2532. Otherwise, checking if the quota allocated size is greater than the quota minimum size is performed as indicated at a decision block 2534. If the quota allocated size is greater than the quota minimum size, then extra entitlement flag is set to true as indicated at a block 2536. Otherwise, and following entry point 2538, the current quota is set to the next quota in list as indicated at a block 2540, and the count value is incremented as indicated at a block 2542. Operations continue following logic entry point 2584 in FIG. 25A to determine if the count is less than the registered quota count at decision block 2510 and continue as described above.

Figure 25D:
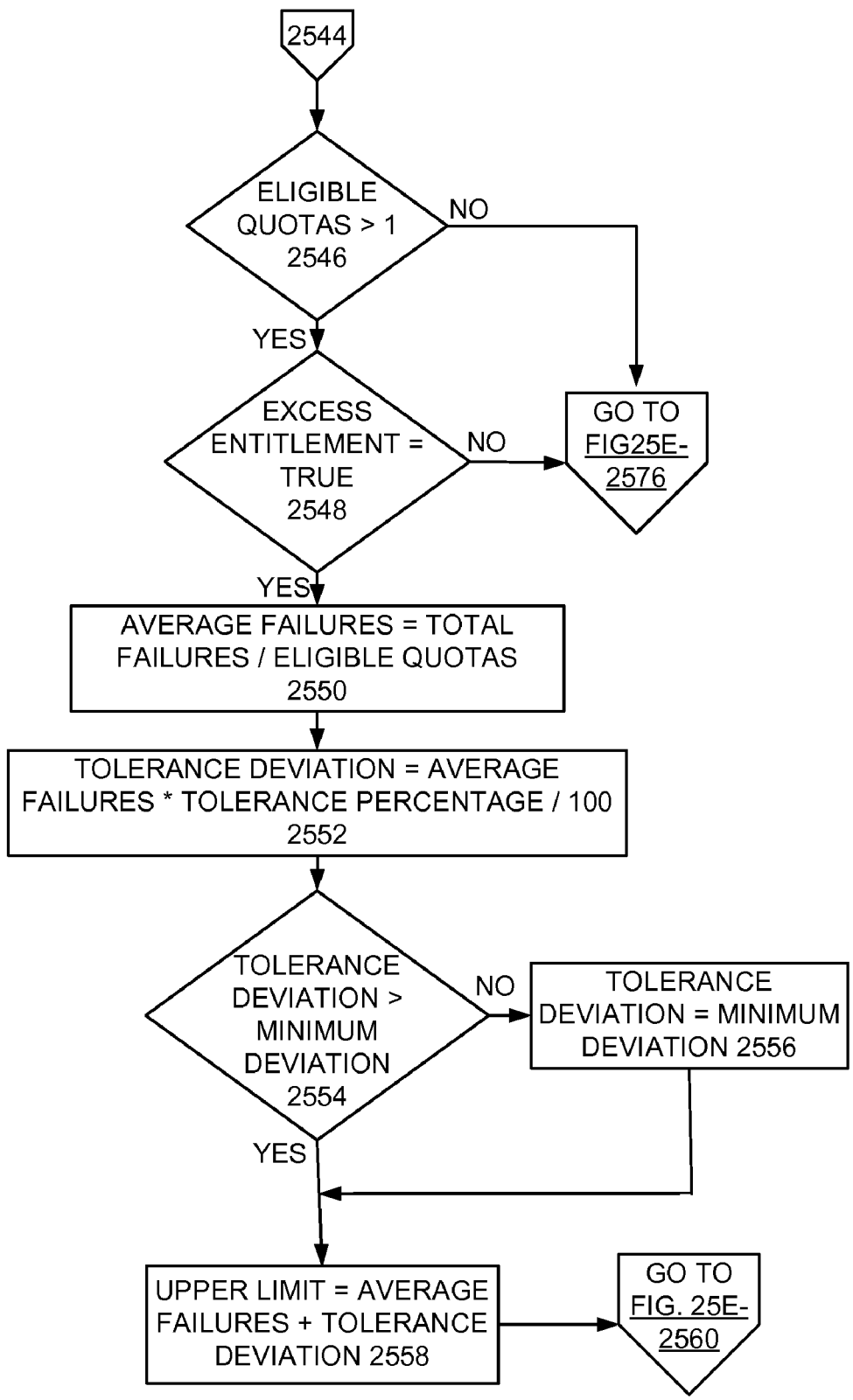
Figure 25E:
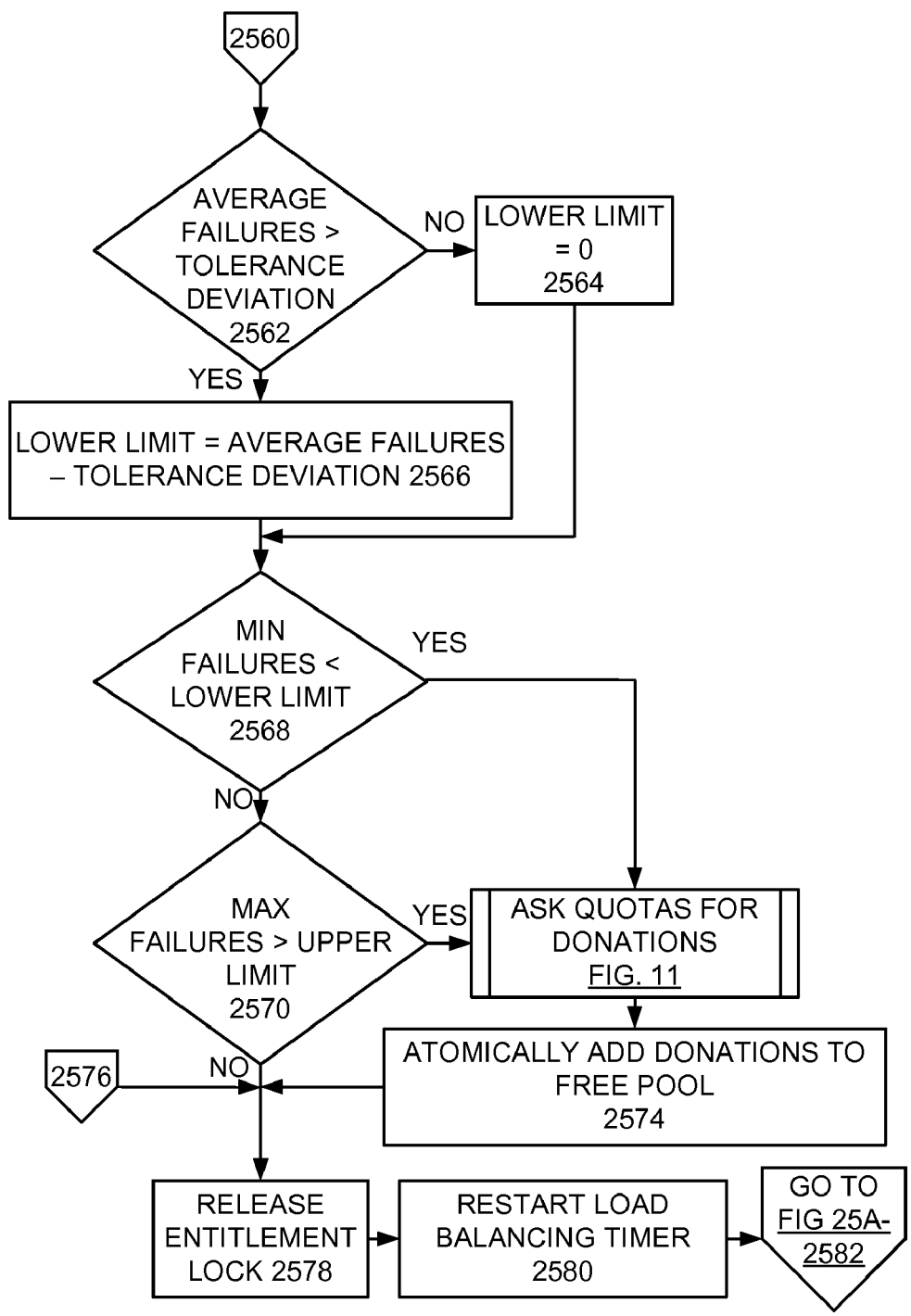

FIGS. 25D and 25E illustrate how the Entitlement Manager determines if rebalancing should be attempted by calculating the upper and lower tolerance limits for mapping failures within the time interval and using those calculations to decide if the rebalancing criteria stated above has been satisfied. If so, the Entitlement Manager calls Ask Quotas For Donation, which is illustrated in FIG. 11, with a parameter type of Iterative and then atomically adds the entitlement donated to the Free Pool. The Entitlement Manager then releases the entitlement lock and restarts the load balancing timer, which will once again redriving the Rebalance Entitlement logic when the timer expires.

Referring now to FIG. 25D following logic entry point 2544, if the count is not less than the registered quota count at decision block 2510 in FIG. 25A, then checking if the eligible quotas are greater than one as indicated at a decision block 2546. If the eligible quotas are not greater than one at decision block 2546, operations continue following logic entry point 2576 in FIG. 25E. If the eligible quotas are greater than one at decision block 2546, checking if the excess entitlement flag is set is performed as indicated at a decision block 2548. If the quota entitlement flag is set, then average failures is determined by dividing the total failures by eligible quotas as indicated at a block 2550. Then multiplying the average failures by tolerance percentage and dividing by 100 as indicated at a block 2552 calculate the tolerance deviation, for example, where the tolerance percentage equals 5 in the preferred embodiment. Checking if the tolerance deviation is greater than a minimum deviation is performed as indicated at a decision block 2554, for example, where the minimum deviation equals 10 in the preferred embodiment. If the tolerance deviation is not greater than the minimum deviation, then the tolerance deviation is set equal to the minimum deviation as indicated at a block 2556. After the tolerance deviation is set equal to the minimum deviation at block 2556 or if the tolerance deviation is greater than the minimum deviation, then the upper limit is calculated equal adding the tolerance deviation to the average failures as indicated at a block 2558. Operations continue following logic entry point 2560 in FIG. 25E.

Referring now to FIG. 25E following logic entry point 2560, if the average failures are not greater that the tolerance deviation as indicated at a decision block 2562, then the lower limit is set to zero as indicated at a block 2564. Otherwise if the average failures are greater that the tolerance deviation at decision block 2562, then the lower limit is calculated by subtracting the tolerance deviation from the average failures as indicated at a block 2566. Checking if the minimum failures are less than lower limit is performed as indicated at a decision block 2568. If the minimum failures are not less than the lower limit, then checking if the maximum failures are greater than the upper limit is performed as indicated at a decision block 2570. If the minimum failures are less than the lower limit or the maximum failures are greater than the upper limit, then Ask Quota For Donation, which is illustrated in FIG. 11, is called. 2576 Donations are atomically added to the Free Pool as indicated at a block 2574, the entitlement lock is released as indicated at a block 2578, and the load balancing timer is restarted as indicated at a block 2580. Operations continue returning to logic entry point 2501 in FIG. 25A when the timer delay expires as timer operations may be driven asynchronously.

Referring now to FIG. 26, there are shown exemplary steps for implementing Entitlement Manager Add/Remove Entitled Memory Capacity in accordance with the preferred embodiment starting at a block 2600. Entitlement Manager Add/Remove Entitled Memory Capacity logic of FIG. 26 is called when the end user initiates a dynamic change to the amount of entitlement assigned to the partition through a user interface. The notification to the Entitlement Manager includes the new entitlement size, for example, specified in megabytes and the partition is permitted to not fully honor the request, for example by only reducing the entitlement size by some portion of the amount requested.

The Entitlement Manager first converts the target capacity in MB to bytes as indicated at a block 2602 and then converts the bytes to entitlement units as indicated at a block 2604. The Entitlement Manager then acquires the entitlement lock as indicated at a block 2606. The Entitlement Manager compares the target entitlement units to the current total entitlement as indicated at a decision block 2608. If the target value is less than the current total, the Entitlement Manager calls Reduce Entitlement, which is illustrated in FIG. 27, to attempt to remove entitlement from the partition. If the target value is greater than the current total as indicated at a decision block 2612, the Entitlement Manager calculates the entitlement increase by subtracting the current total from the target value as indicated at a block 2614. The Entitlement Manager then atomically adds the entitlement increase to the Free Pool as indicated at a block 2616 and sets the current total entitlement to the target value as indicated at a block 2618. The Entitlement Manager releases the entitlement lock as indicated at a block 2620 and exits as indicated at a block 2622.

Referring now to FIG. 27, there are shown exemplary steps for implementing Reduce Entitlement in accordance with the preferred embodiment starting at a block 2700. Reduce Entitlement of FIG. 27 is called by the Entitlement Manager to remove as much unused entitlement as possible from the partition. The entitlement lock is held when Reduce Entitlement is called.

As indicated at a decision block 2702 the Entitlement Manager determines if the target entitlement value is less than the partition minimum value, which is the summation of the minimum values from all registered Quotas. If the target entitlement value is less than the partition minimum value, the target entitlement value is set to the partition minimum entitlement as indicated at a block 2704. The Entitlement Manager then calculates the amount of entitlement to be removed by subtracting the target entitlement value from the current total entitlement value as indicated at a block 2706. The Entitlement Manager then calls Allocate Entitlement, which is illustrated in FIG. 11, to try to allocate the calculated amount of unused entitlement. The new total entitlement value is then set by subtracting the actual amount of unused entitlement allocated from the old total entitlement value as indicated at a block 2710, then the operations return as indicated at a block 2712.

Figure 28:
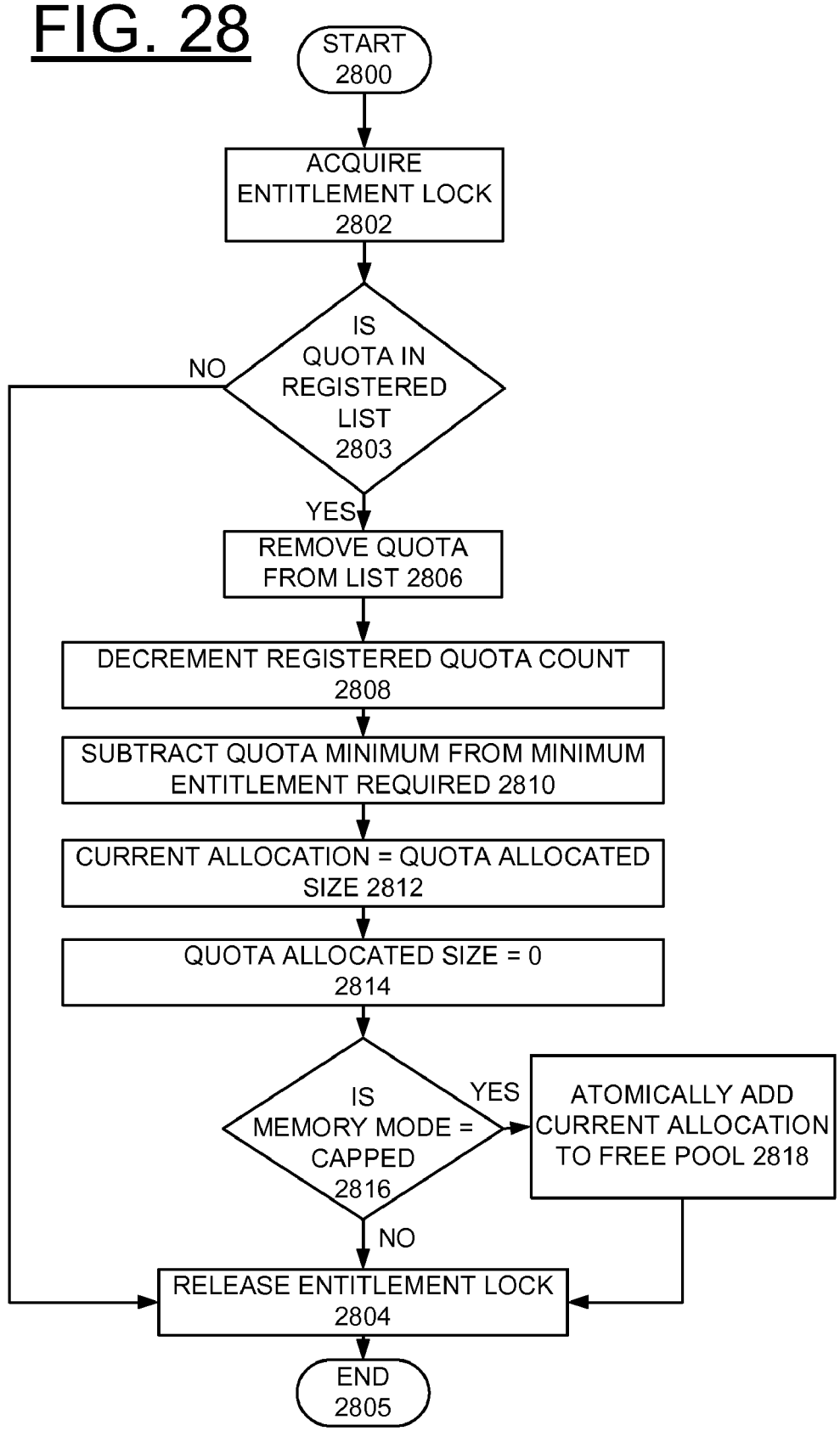

Referring now to FIG. 28, there are shown exemplary steps for implementing Deregister Quota in accordance with the preferred embodiment starting at a block 2800. Deregister Quota of FIG. 28 is called by an Adapter Driver when the I/O Adapter no longer requires its Quota of I/O memory capacity, for example, if the I/O Adapter is dynamically removed from the configuration. The Entitlement Manager acquires the entitlement lock as indicated at a block 2802 and determines if the Quota is in the registered list as indicated at a decision block 2803. If not, the Entitlement Manager releases the entitlement lock as indicated at a block 2804 and returns as indicated at a block 2805. Otherwise, the Quota is removed from the list as indicated at a block 2806 and the count or number of registered Quotas is decremented by 1 as indicated at a block 2808. The Quota minimum entitlement value is then subtracted from the partition minimum entitlement required value as indicated at a block 2810. The Entitlement Manager copies the Quota allocated size to a local variable as indicated at a block 2812 and then sets the Quota allocated size to 0 as indicated at a block 2814. If the I/O memory mode is capped as indicated at a decision block 2816, the Entitlement Manager atomically adds the local copy of the Quota's allocation to the Free Pool as indicated at a block 2818. Then the Entitlement Manager releases the entitlement lock at block 2804 and returns at block 2805.

Figure 29:
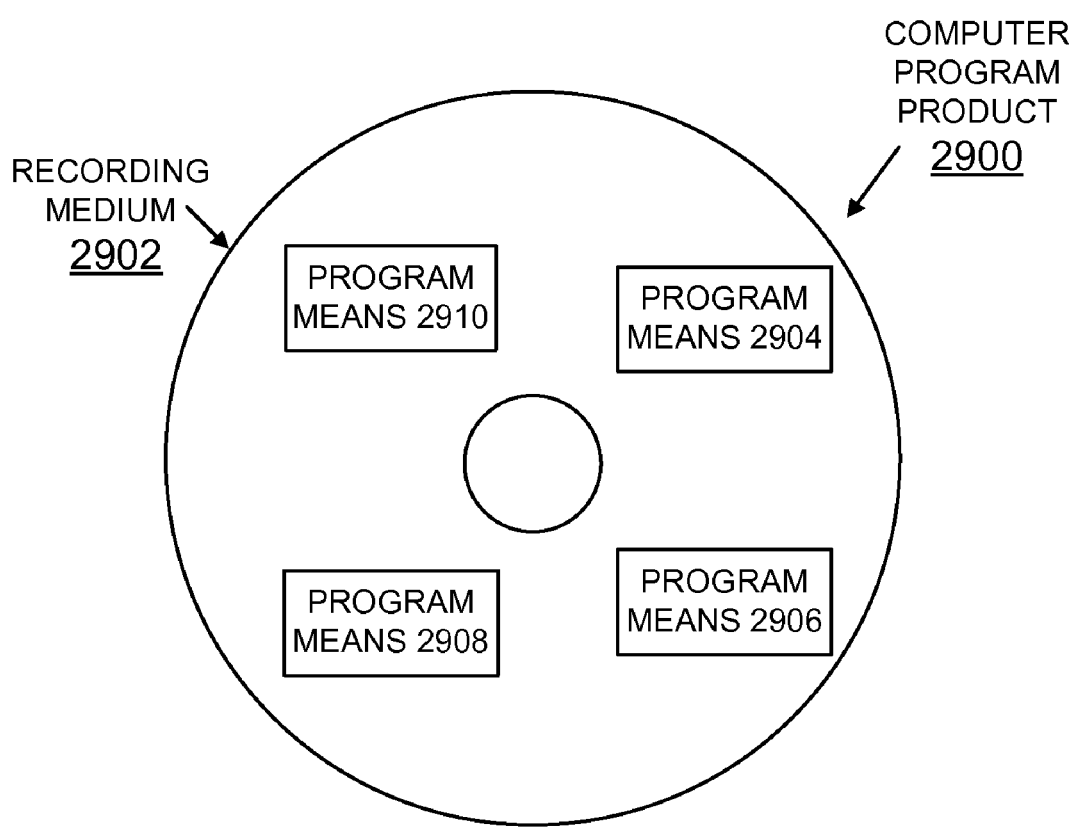
FIG. 29 is a block diagram illustrating a computer program product in accordance with the preferred embodiment.

Referring now to FIG. 29, an article of manufacture or a computer program product 2900 of the invention is illustrated. The computer program product 2900 is embodied in a machine readable medium and includes a recording medium 2902, such as, a floppy disk, a high capacity read only memory in the form of an optically read compact disk or CD-ROM, a tape, or another similar computer program product. Recording medium 2902 stores program means or instructions 2904, 2906, 2908, 2910 on the medium 2902 for carrying out the methods for dynamically allocating limited system memory for direct memory access (DMA) among multiple adapters of the preferred embodiment in the computer system 100 of FIG. 1.

A sequence of program instructions or a logical assembly of one or more interrelated modules defined by the recorded program means 2904, 2906, 2908, 2910, direct the computer system 100 for dynamically allocating limited system memory for direct memory access (DMA) among multiple adapters of the preferred embodiment.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

While the present invention has been described with reference to the details of the embodiments of the invention shown in the drawing, these details are not intended to limit the scope of the invention as claimed in the appended claims.

What is claimed is:

1. An apparatus for dynamically allocating limited system memory for direct memory access (DMA) among multiple I/O adapters in a system partition comprising:
    a partition entitlement manager using a free memory pool and managing I/O entitled memory capacity assigned to the system partition, said partition entitlement manager embodied in a non-transitory machine readable medium, said partition entitlement manager initially allocating a minimum entitlement of said I/O entitled memory capacity to each of the respective multiple I/O adapters, said minimum entitlement enabling operation of each respective I/O adapter driver;
    a respective quota managing I/O entitled memory for each respective I/O adapter; said quota embodied in a non-transitory machine readable medium, said respective quota allowing unused entitlement allocated to the respective I/O adapter driver to be returned to said free memory pool; said respective quota allowing an amount of the entitlement allocated to be increased due to I/O demand; and
    said partition entitlement manager selectively allocating additional entitlement of I/O entitled memory capacity based upon I/O demands of each respective I/O adapter.

2. The apparatus for dynamically allocating limited system memory as recited in claim 1 wherein said partition entitlement manager initially allocating a minimum entitlement of I/O entitled memory capacity to each of the respective I/O multiple adapters includes said partition entitlement manager assigning unassigned entitlement of I/O entitled memory capacity to said free memory pool.

3. The apparatus for dynamically allocating limited system memory as recited in claim 1 wherein said partition entitlement manager determines the amount of entitlement assigned to the system partition.

4. The apparatus for dynamically allocating limited system memory as recited in claim 1 wherein said partition entitlement manager maintains said free memory pool of entitlement available to I/O adapters.

5. The apparatus for dynamically allocating limited system memory as recited in claim 1 wherein said partition entitlement manager periodically reallocates unused allocated entitlement of the respective multiple I/O adapters.

6. The apparatus for dynamically allocating limited system memory as recited in claim 1 wherein said partition entitlement manager allows the amount of entitlement assigned to the system partition to change dynamically.

7. The apparatus for dynamically allocating limited system memory as recited in claim 1 wherein said quota allocates said initial minimum entitlement enabling operation of the I/O adapter driver.

8. The apparatus for dynamically allocating limited system memory as recited in claim 7 wherein said partition entitlement manager determines an I/O memory mode of capped or uncapped for the system partition, and responsive to said I/O entitled memory capacity assigned to the system partition being less than a calculated minimum required memory capacity, terminates partition initialization returning an error code.

9. The apparatus for dynamically allocating limited system memory as recited in claim 7 wherein each said respective quoto is initialized and registered with said partition entitlement manager.

10. The apparatus for dynamically allocating limited system memory as recited in claim 7 wherein said quota allows selectively modifying a minimum amount of said initially assigned minimum entitlement.

11. The apparatus for dynamically allocating limited system memory as recited in claim 7 wherein said partition entitlement manager requests donations from said quotas to reclaim unused allocated entitlement.

12. The apparatus for dynamically allocating limited system memory as recited in claim 1 wherein said I/O adapter driver handles insufficient entitlement by deferring a pending I/O request until previous I/O requests release sufficient entitlement to satisfy the pending I/O request.

13. A computer-implemented method for dynamically allocating limited system memory for direct memory access (DMA) among multiple I/O adapters in a system partition, said method comprises the steps of:
    using a free memory pool and managing I/O entitled memory capacity assigned to the system partition, initially assigning a minimum entitlement of said I/O entitled memory capacity to each of the respective multiple I/O adapters, said minimum entitlement enabling operation of an I/O adapter driver;

managing I/O entitled memory for each respective I/O adapter, allowing unused entitlement allocated to the respective I/O adapter driver to be returned to a free memory pool; and allowing an amount of the entitlement allocated to be increased due to I/O demand; and selectively allocating additional entitlement of I/O entitled memory capacity based upon I/O demands of each respective I/O adapter.

14. The computer-implemented method for dynamically allocating limited system memory as recited in claim 13 wherein initially assigning a minimum entitlement of I/O memory capacity to each of the respective multiple I/O adapters includes assigning unassigned entitlement of I/O entitled memory capacity to said free memory pool.

15. The computer-implemented method for dynamically allocating limited system memory as recited in claim 13 includes maintaining said free memory pool of entitlement available to the I/O adapters.

16. The computer-implemented method for dynamically allocating limited system memory as recited in claim 13 includes periodically reallocating unused allocated entitlement of the respective multiple I/O adapters.

17. The computer-implemented method for dynamically allocating limited system memory as recited in claim 13 includes dynamically changing an amount of entitlement assigned to the system partition.

18. A computer program product embodied on a computer readable storage medium for dynamically allocating limited system memory for direct memory access (DMA) among multiple I/O adapters in a computer system, said computer readable storage medium storing instructions, and said instructions when executed by the computer system cause the computer system to perform the steps comprising:

using a free memory pool and managing I/O entitled memory capacity assigned to a system partition, initially allocating a minimum entitlement of said I/O entitled memory capacity to each of the respective multiple I/O adapters, said minimum entitlement enabling operation of an I/O adapter driver;

managing I/O entitled memory for each respective I/O adapter, allowing unused entitlement allocated to the respective I/O adapter driver to be returned to a free memory pool; and allowing an amount of the entitlement allocated to be increased due to I/O demand; and selectively allocating additional entitlement of I/O entitled memory capacity based upon I/O demands of each respective I/O adapter.

19. The computer program product as recited in claim 18 wherein initially allocating minimum entitlement of I/O entitled memory capacity to each of the respective multiple I/O adapters includes assigning unassigned I/O memory to said free memory pool.

20. The computer program product as recited in claim 18 wherein selectively allocating additional entitlement of I/O entitled memory capacity based upon I/O demands of each I/O adapter includes maintaining said free memory pool of entitlement available to the I/O adapters.

\* \* \* \* \*